INVENTOR.
Wallace W. Wolford
BY J. R. Nelson and
W. A. Schaich
ATTORNEYS

INVENTOR.
WALLACE W. WOLFORD

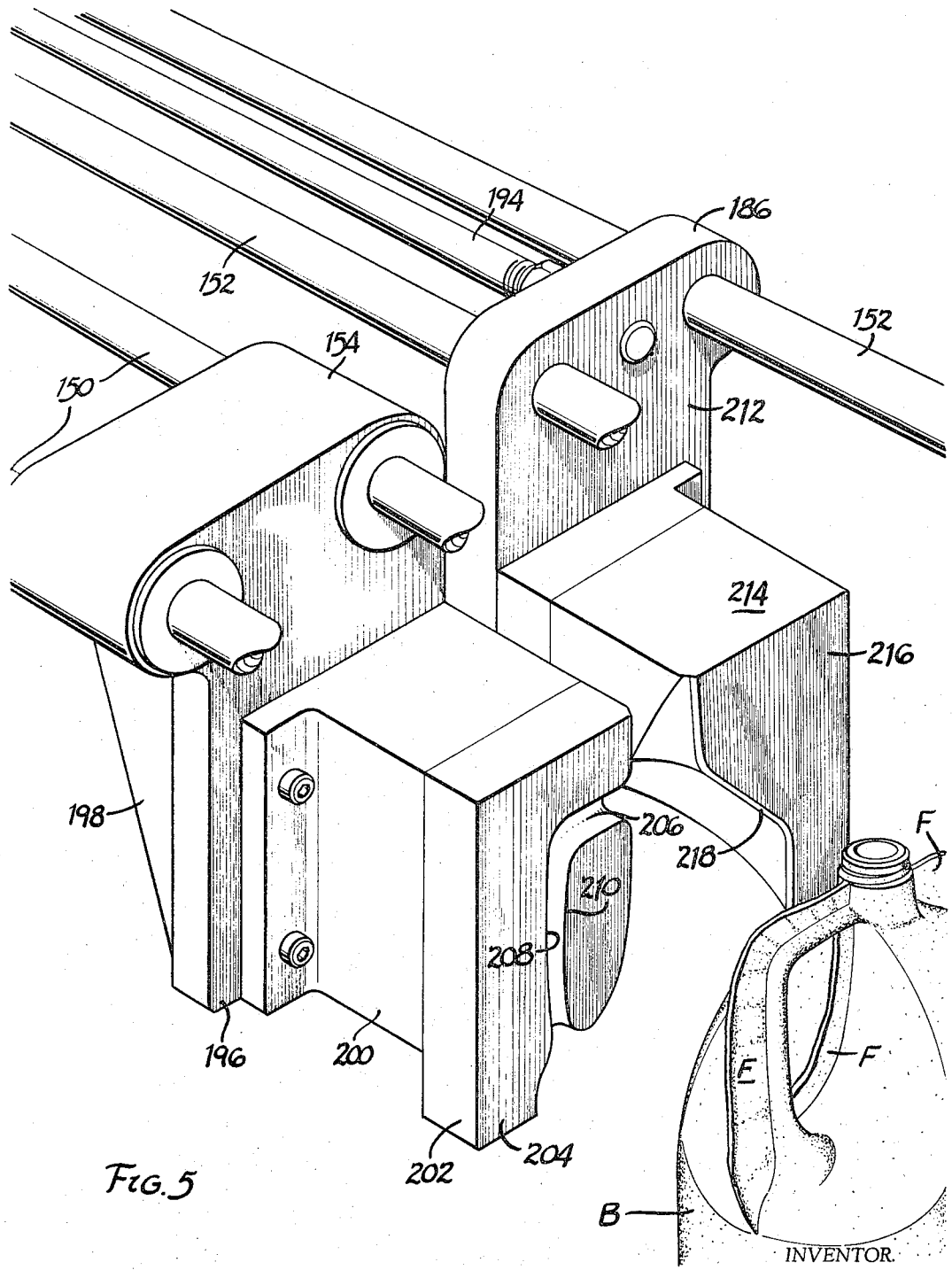

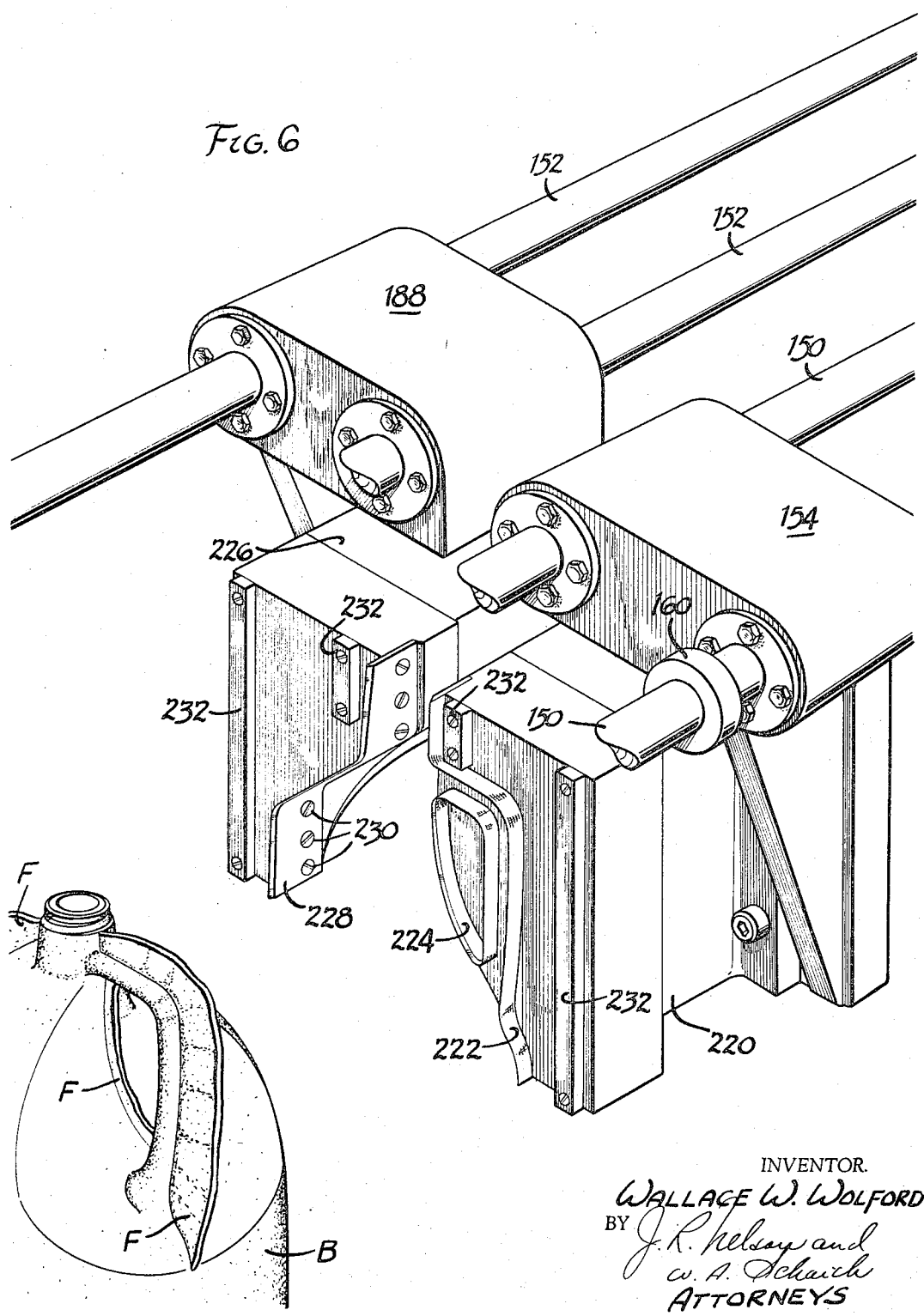

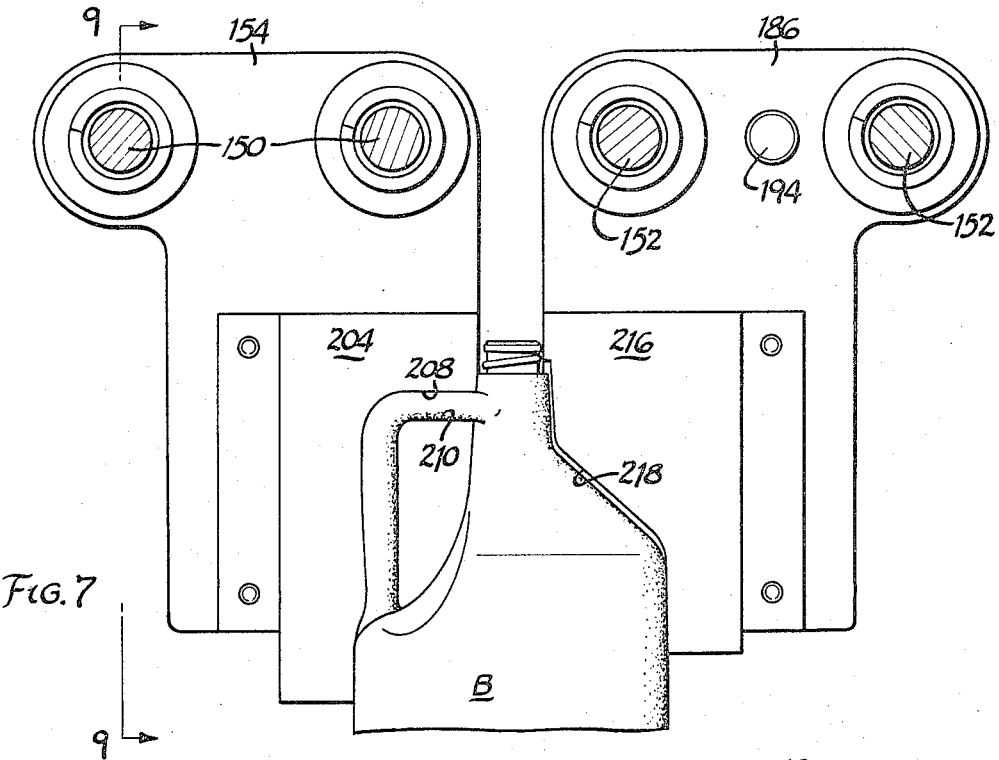
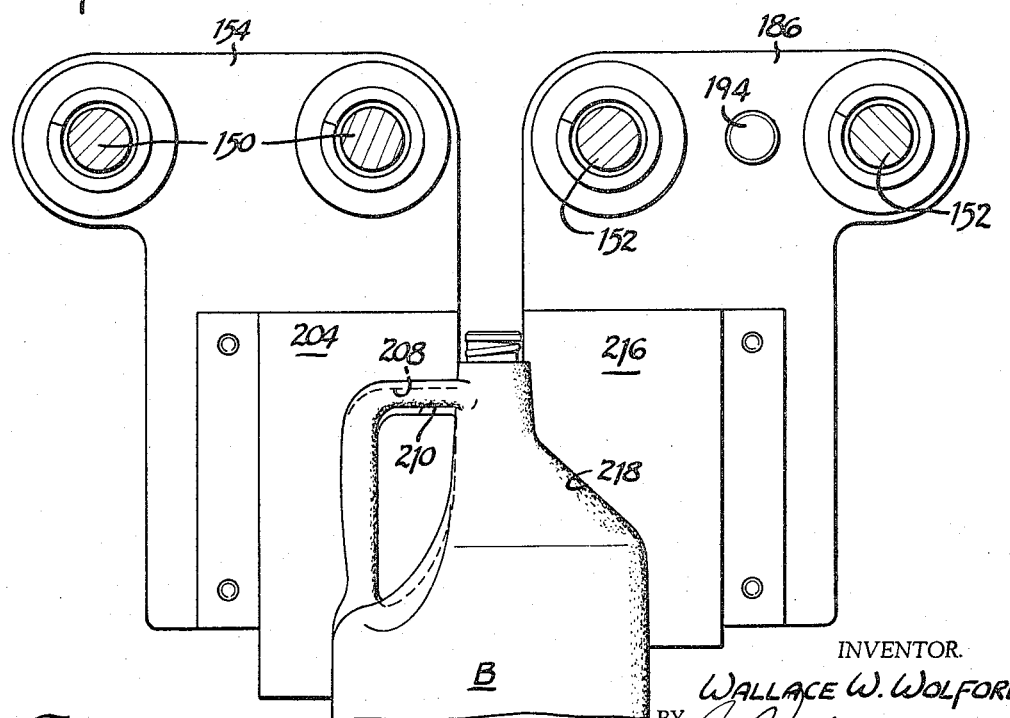

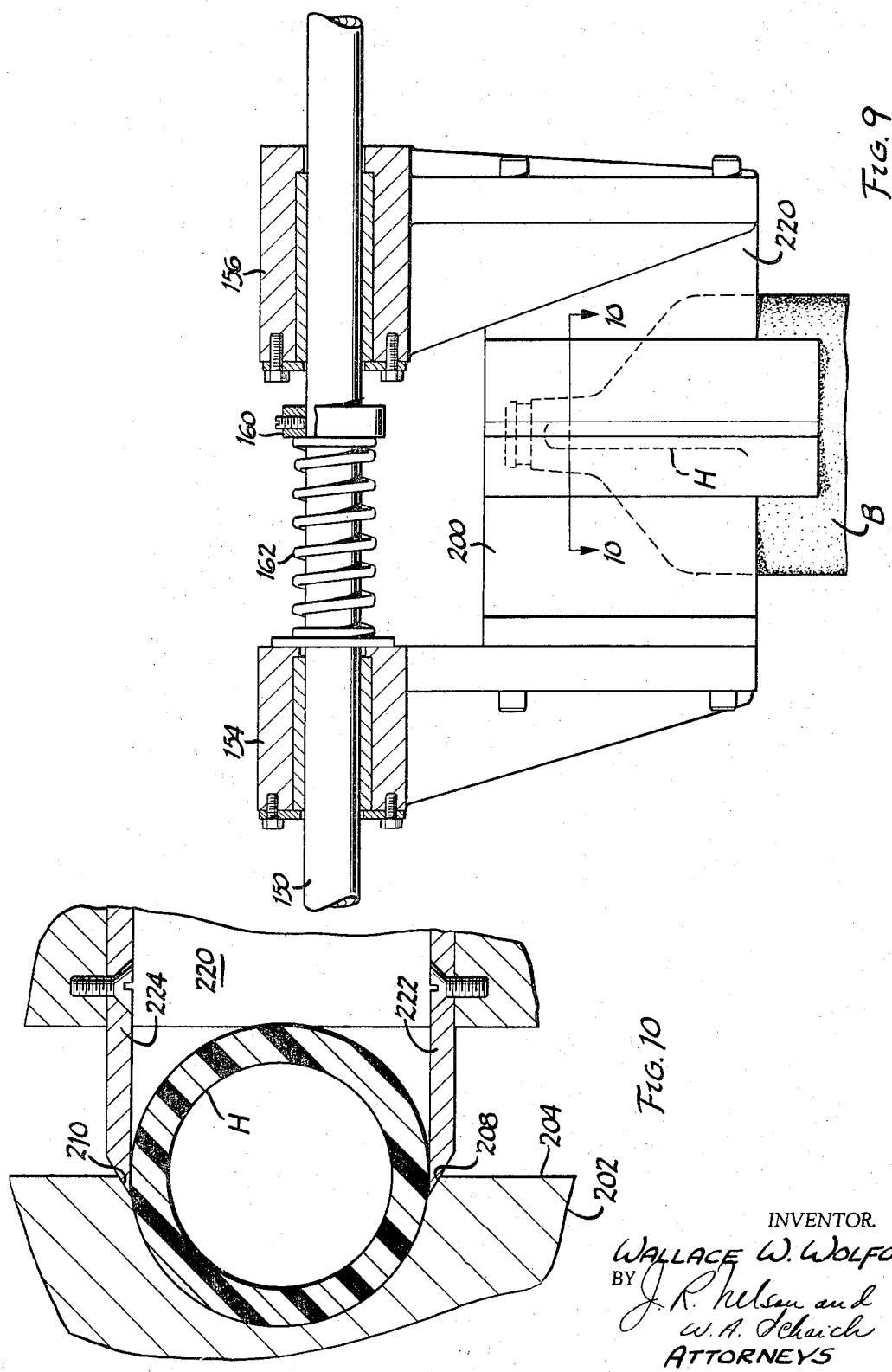

April 16, 1968 W. W. WOLFORD 3,377,899
PLASTIC BOTTLE TRIMMING MACHINE
Filed Aug. 13, 1963 16 Sheets-Sheet 9

INVENTOR.
WALLACE W. WOLFORD
BY
ATTORNEYS

INVENTOR.
WALLACE W. WOLFORD
BY
ATTORNEYS

INVENTOR.
WALLACE W. WOLFORD
BY J. R. Kelsey and
W. A. Schaich
ATTORNEYS

April 16, 1968 W. W. WOLFORD 3,377,899
PLASTIC BOTTLE TRIMMING MACHINE
Filed Aug. 13, 1963 16 Sheets-Sheet 14

INVENTOR.
WALLACE W. WOLFORD
BY
J. R. Nelson and
W. A. Schaich
ATTORNEYS

INVENTOR.
WALLACE W. WOLFORD

United States Patent Office 3,377,899
Patented Apr. 16, 1968

3,377,899
PLASTIC BOTTLE TRIMMING MACHINE
Wallace W. Wolford, Toledo, Ohio, assignor to Owens-Illinois, Inc., a corporation of Ohio
Filed Aug. 13, 1963, Ser. No. 301,757
12 Claims. (Cl. 83—213)

This invention relates to method and apparatus for removing flash from molded articles, such as plastic bottles.

For convenience, certain terms employed in the specification are defined as follows:

The term "flash" refers to a finlike web which projects from the surface of the article. Flash is formed in the molding operation by material which is caught between the closing mold halves or forced between the mold half faces during the molding operation.

The term "general plane of the flash" refers to that general plane in which the flash lies. In the usual case this general plane is a central vertical plane containing the vertical centerline of the article. It will contain the parting lines of the mold halves.

The term "line of juncture" refers to the line along which the flash is joined to the article surface—i.e. the line of intersection of the general plane of the flash with the article surface.

Because of the fact that the flash has a finite thickness, the terms "general plane" and "line of juncture" are used in a generalized sense, rather than a strict geometrical manner.

While the invention will be described specifically in terms of removing the flash from a molded plastic bottle having an integrally molded handle, it will become apparent from the description that the invention is applicable to other types of molded articles. The molded plastic bottle having a handle has been chosen as a specific example since this particular article presents a wide variety of problems of flash removal.

In the molding of plastic bottles of the foregoing type, the neck or finish of the bottle is first injection molded and a tubular parison is formed, or the tubular parison is formed and the neck or finish is blown in the molds. The parison is then positioned in operative alignment with a pair of blow mold halves which are then closed upon the parison. The interior of the tubular parison is then pressurized to expand the parison into contact with the mold walls. In the formation of handled bottles, the tubular parison is initially expanded prior to the closing of the mold to make sure that the handle portion of the mold will close upon a portion of the parison. This inherently requires that the closing mold halves grip between them some of the plastic material of the parison, thereby resulting in a web of plastic material within the handle opening at the conclusion of the molding process. Additionally, as the mold closes, a certain amount of the parison is caught between the closing mold faces in the region of the shoulder, thus resulting in projecting fins on the shoulder of the completed article. The projecting fins and the web within the handle opening are referred to below generally as "flash."

While attempts have been made to provide apparatus for automatically removing the flash formed on the molded bottle in the manner described above, many problems have been encountered Experience has shown that in molded plastic articles of this type, the articles produced by the molding operation described generally above are not precisely uniform and variations will be encountered even in articles produced from the same mold. These variations, unfortunately, are most prevalent in the region where the flash is formed and thus most prior machines designed to automatically remove the flash from the article have not been found to be economically feasible due to high reject rates caused primarily by difficulties in accurately aligning the article with the flash severing apparatus.

In the case where reciprocating knives and dies are employed to sever the flash from the article along the line of juncture of the flash with the article, lack of precision of the initial alignment of the article with the reciprocating die knife assembly results in the knife cutting either too deeply into the flash, thereby leaving a projecting rib on the article, or cutting too deeply into the article surface, resulting in a weakened spot or even cutting entirely through the relatively thin-walled bottle.

Because of these difficulties, it has been conventional practice in the industry to manually sever the flash from the articles. In view of the fact that bottles of the type under consideration are produced in substantial quantities (a bottle similar to that under consideration being presently employed to market a leading brand of bleach on a nationwide basis) manual removal of the flash from the bottle is obviously impractical.

Accordingly, it is an object of the present invention to provide a method and apparatus for removing flash from molded articles wherein accurate severing of the flash from the articles is achieved even in the presence of normally encountered variations in the article configuration.

It is another object of the invention to provide method and apparatus for removing flash from molded articles by means of a die-knife combination wherein the article is accurately aligned and registered with the severing apparatus by using the surface to be cut as the surface which orients the article relative to the severing apparatus.

Still another object of the invention is to provide method and apparatus for severing the flash from molded articles wherein the flash may be joined to the article along lines of juncture which are non-symmetrical, separated, and/or of variable contour.

The foregoing, and other objects are achieved in an apparatus in which two separate dies are provided, one die having a die edge corresponding to the line of juncture of the flash and article surface at one side of the article centerline, and the second die having a die edge corresponding to the line of juncture at the opposite side of the centerline of the article surface.

In the case of the bottle under consideration, these dies are conveniently defined as the "handle" die and the "rear shoulder" die. Each of the dies has operatively associated with it a knife having a cutting edge conformed to the shape of the die edge and mounted for movement into and out of mating engagement with the die edge.

Accurate and precise alignment in the article in the apparatus is achieved by moving the article into seated engagement with its die in a fashion such that the final position of the article with respect to the die is determined by the engagement of the line of juncture on the article or the surface of the article or flash closely adjacent the line of juncture, with the corresponding surfaces of the die.

In the case under consideration where there are two separated lines of juncture (one on each side of the bot-the neck) the article is seated first in one of the two dies and the corresponding knife is actuated to sever the flash from that side of the article. The first die and knife are then retracted clear of the article and the article is then seated in the second die, the final position of the article relative to the second being again determined by the engagement of the article with the die at or closely adjacent to the line of juncture. The second knife is then actuated to sever the flash from the second side of the article.

By employing the surface to be cut as the orienting surface to locate the article relative to the die, minor variations of configuration and relative location of surfaces on the article are of no consequence, since the surface to be cut is employed to position itself in the proper position in the die and knife assembly.

Other objects and features of the invention will become apparent by reference to the following specification and to the drawings.

In the drawings:

FIGURE 5 is a detail perspective view with certain parts broken away or omitted, showing details of the die assembly of the apparatus;

FIGURE 6 is a detail perspective view, with certain parts broken away or omitted, showing details of the knife assembly of the apparatus;

FIGURE 7 is a detail cross-sectional view taken on the line 7—7 of FIG. 2 showing a portion of a bottle in operative relationship with the handle die;

FIGURE 8 is a cross-sectional view corresponding to FIG. 7 showing a portion of the bottle in operative relationship with the rear shoulder die;

FIGURE 9 is another detail cross-sectional view taken on line 9—9 of FIG. 7;

FIGURE 10 is a detail cross-sectional view taken on line 10—10 of FIG. 9, showing details of the mating engagement between the knife and die edges;

Figure 1:
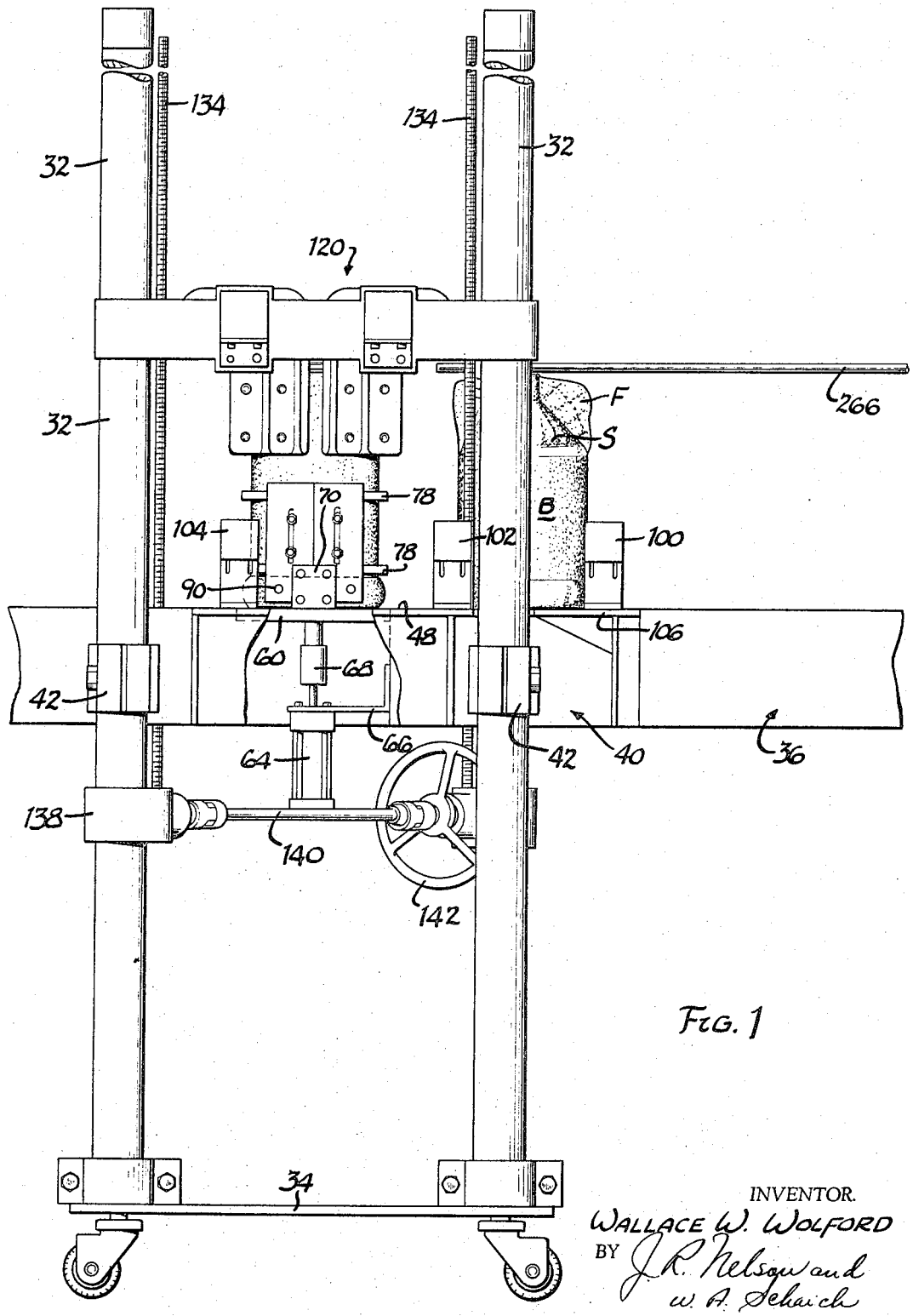
FIGURE 1 is a side elevational view of the flash-severing portion of an apparatus embodying the invention with certain parts broken away to show details of the structure.

Referring first to FIGURES 1 through 4, apparatus embodying the present invention includes a frame designated generally 30 which includes four vertical posts 32 rigidly held in their assembled position by various cross braces or other rigid framework located near the lower end of the posts, such as indicated at 34 in FIG. 1, the cross bracing having been omitted from the remaining figures since it may take any suitable form and does not, per se, form any part of the present invention. A belt conveyor of conventional construction, designated generally at 36, is supported so that its upper or carrying run 38 passes between vertical posts 32, the conveyor being driven by suitable means, not shown, to convey articles from which flash is to be removed into operative relationship with the apparatus which removes the flash, this apparatus being mounted upon posts 32. The upper run 38 of conveyor 36 moves from right to left as viewed in FIG. 1 and from left to right as viewed in FIGS. 3 and 4.

A first sub-frame assembly designated generally 40 is mounted upon posts 32 at a selected position of vertical adjustment and fixedly clamped at the selected position by clamping assemblies 42. Referring now particularly to FIG. 3 sub-frame 40 includes a pair of side members 44 which extend transversely of the structure between the upper and lower runs of the belt of conveyor assembly 36. At either side of conveyor 36, vertical plates 46 are fixedly secured to and extend between side members 44. At one side of the conveyor, a first horizontal plate 48 is fixedly secured to plate 46, plate 48 being suitably braced as by a vertical web 50 (FIG. 2) which may be welded to plates 46 and 48. At the opposite side of conveyor 36, a somewhat smaller horizontal plate 54 is similarly secured and a triangular bracing web 56 assists in supporting plate 54.

Figure 2:
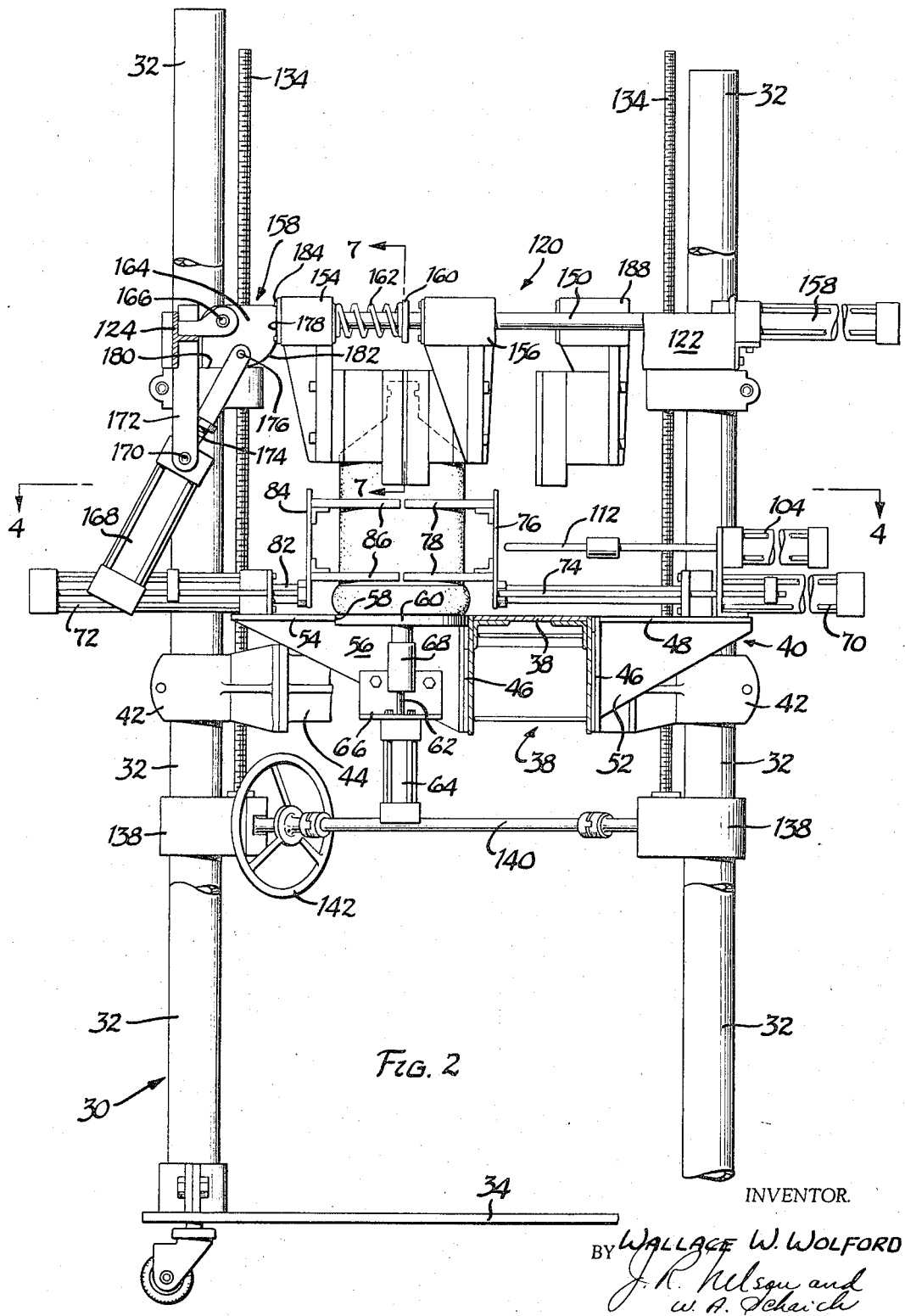
FIGURE 2 is an end elevational view of the structure shown in FIG. 1 looking from the left-hand end of the structure as shown in FIG. 1.
Figure 3:
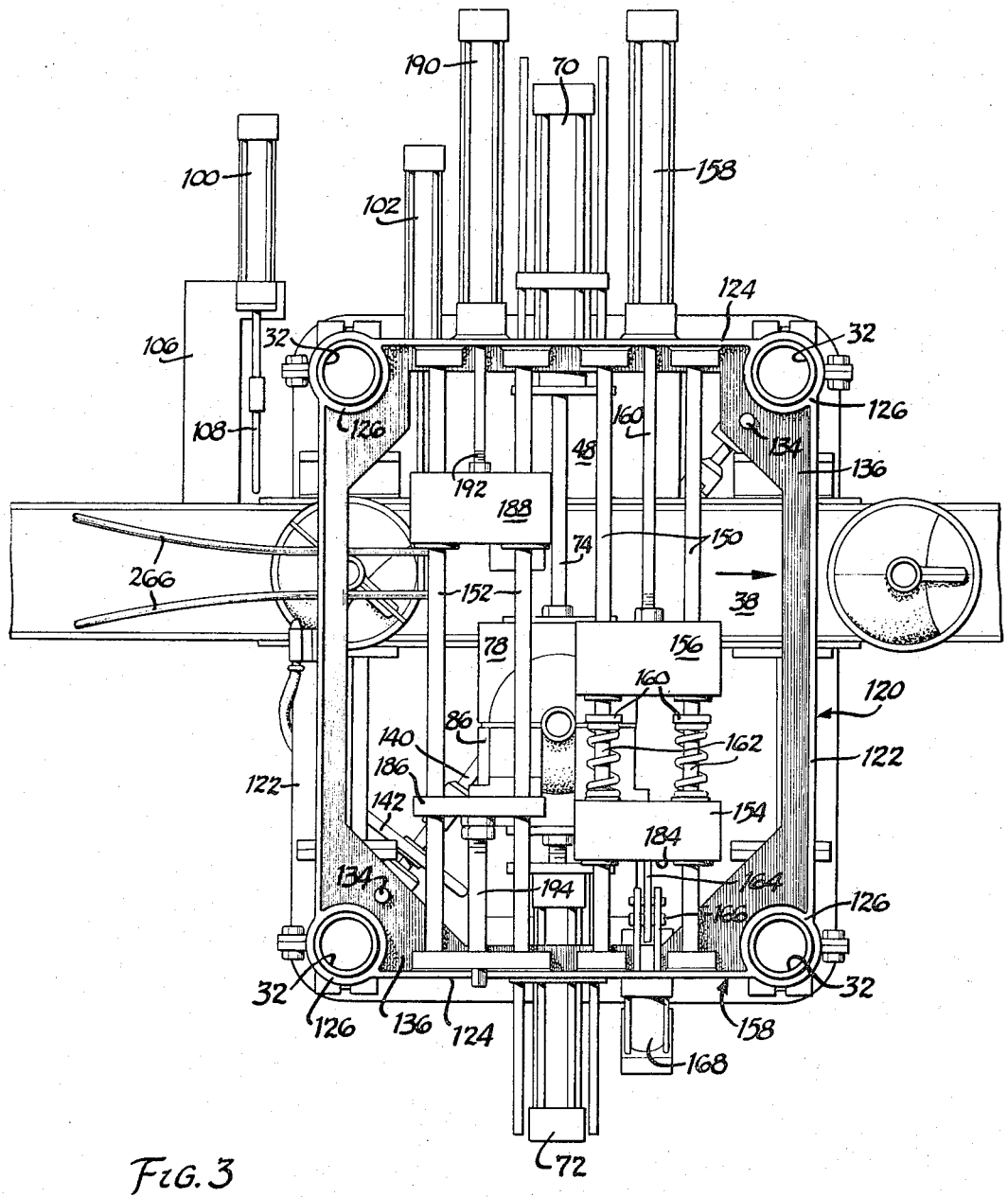
FIGURE 3 is a top plan view of that portion of the apparatus shown in FIG. 1.

Referring now to FIG. 2, plate 54 is formed with a circular opening 58 of a diameter sufficient to clear the circumference of a circular platform 60. Platform 60 is mounted upon the end of a piston rod 62 of a pneumatic motor 64, the cylinder of motor 64 being fixedly mounted upon web 56 as by a mounting bracket 66. Platform 60 is freely rotatable about the vertical axis of piston rod 62, and to this end, a suitable anti-friction bearing assembly 68 is employed to support platform 60 on rod 62.

Figure 4:
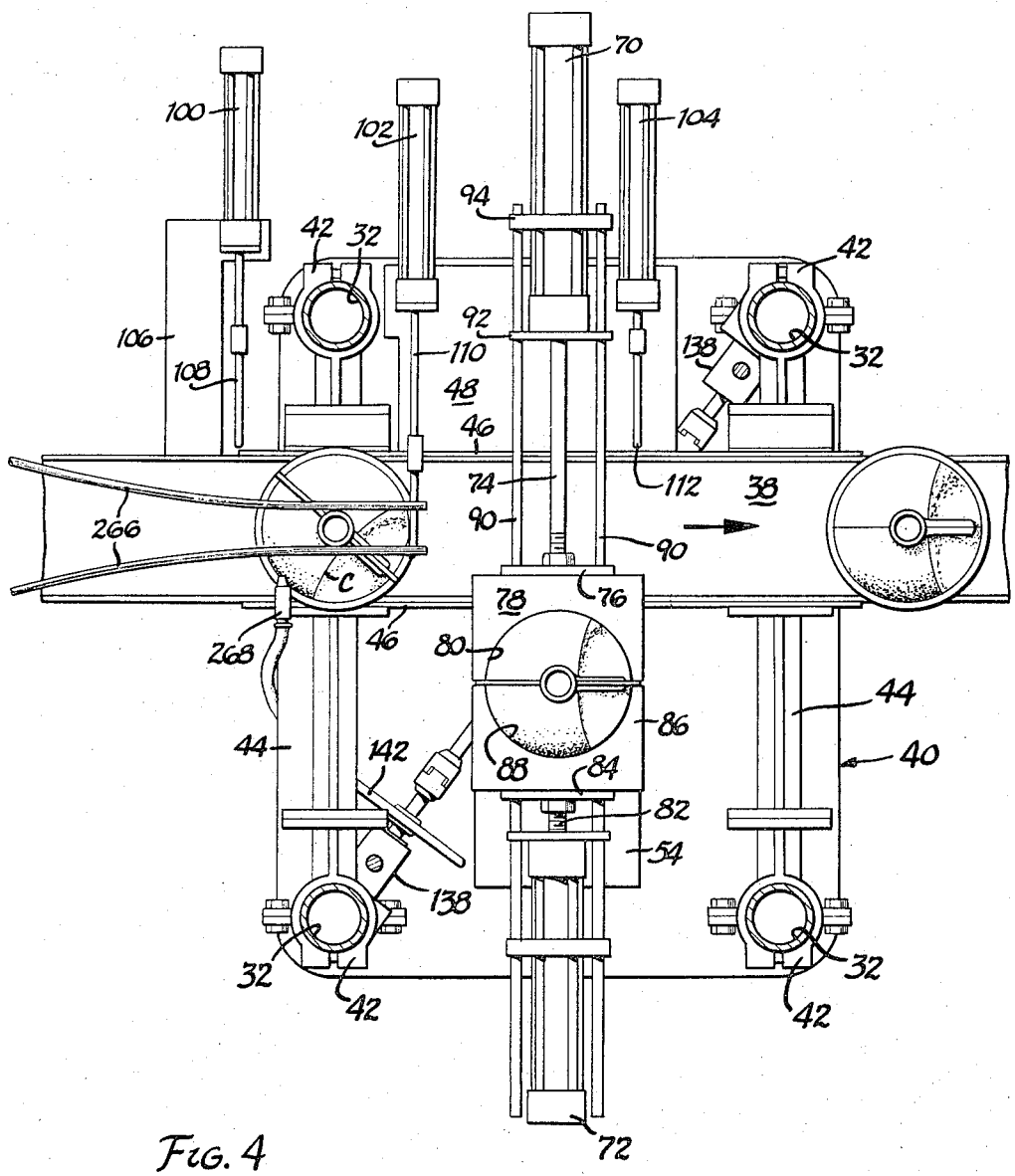
FIGURE 4 is a detail cross-sectional view taken on the line 4—4 of FIG. 2.

Plates 48 and 54 are supported with their upper surfaces lying in the same horizontal plane as that of the upper surface of upper run 38 of belt 36. Plates 48 and 54 respectively support the cylinders of a pair of pneumatic transfer motors 70 and 72. Piston rod 74 of motor 70 carries a vertically disposed plate 76 at its outer end, plate 76 supporting two vertically spaced horizontal article-engaging transfer plates 78 having recesses 80 which are conformed to the shape of the article, as best seen in FIG. 4. Piston rod 82 of motor 72 likewise carries a vertical plate 84 and a pair of horizontal article-engaging transfer plates 86, recessed as at 88 in the same fashion as the corresponding structure on piston rod 74. In the particular case under consideration, the horizontal cross-section of the plastic bottles being handled by the apparatus is circular, and the opposed recesses 80 and 88 substantially completely enclose the horizontal circumference of the bottles. Plates 76 and 78 are supported and guided in movement by means of a pair of rods 90 which slidably pass through bores formed in plates 92 and 94, a precisely similar structure being employed with plates 84 and 86 of motor 72. As will be explained in greater detail, actuation of motors 70 and 72 is synchronized in a fashion such as a bottle received within the recesses 80 and 88 may be shifted between the position shown in FIG. 4 and the upper run 38 of the belt conveyor. Piston rods 74 and 82 may also be retracted clear of the path of movement of bottles on the upper run of conveyor 38 to permit an incoming bottle to be fed from the left into alignment with the motors. Pneumatic motors 70 and 72 and the associated structure carried on their piston rods constitute a horizontal transfer assembly operable to transfer bottles between upper run 38 of the conveyor and platform 60 to locate the vertical axis of the bottle in coincidence with the axis of rotation of platform 60 on its piston rod 62.

Also supported upon sub-frame 40 is a series of pneumatic motors 100, 102 and 104, which function as gates or stops to monitor the movement of bottles into operative relationship with the transfer mechanism constituted by motors 70 and 72. Motor 100 is mounted upon an extension 106 of sub-frame 40 and is provided with piston rod 108 which is shown in its fully extended position in FIG. 4 with the tip of rod 108 projecting into the path of movement of bottles along the carrying run 38 of the conveyor. When in this position, piston rod 108 prevents the movement of bottles along the carrying run. Upon retraction of piston rod 108 clear of the path of movement of articles along the conveyor, articles can move to the right as viewed in FIG. 4 until they are engaged by the extended piston rod of 110 of motor 102.

Location of a bottle in operative alignment with the transfer mechanism constituted by motors 70 and 72 and their associated structures is accomplished by pneumatic motor 104 which is mounted on plate 48 at a location such that an article engaged by the piston rod 112 of motor 104 is disposed in operative alignment with the transfer mechanism.

A die-knife assembly designated generally 120 is supported upon posts 32 above sub-frame 40 at selected positions of vertical adjustment on the post. Referring now to FIGURE 3, assembly 120 includes a generally rectangular frame having integral or rigidly interconnected end walls 122 and side walls 124 and provided at each corner with vertical sleeves 126 which are slidably received on posts 32 so that the frame of the die knife assembly can slide vertically on posts 32. Assembly 120 is positioned at a selected elevation on post 32 by a pair of vertical lead screws 134 which are threaded into horizontal webs 136 formed at diagonally opposed corners of assembly 120. Screws 134 are rotatably mounted at their lower ends in housings 138 which are fixedly mounted at a selected elevation on the corresponding diagonally opposed posts 32. A diagonally extending drive shaft 140 having a hand wheel 142 extends horizontally between the respective housings 138. Each of housings 138 is provided with a suitable gear mechanism to transmit rotation of shaft 140 to the respective vertical lead screws 138 to cause both screws to rotate in the same direction and by the same amount upon manual rotation of hand wheel 142. Thus, by rotating hand wheel 142, die knife assembly 120 can be adjusted vertically in either direction upon posts 32.

As best seen in FIG. 3, die knife assembly 120 is constructed with a series of four parallel horizontal support rods which, for convenience, will be referred to as front support rods 150 and rear support rods 152. Rods 150 and 152 are fixedly mounted in and extend transversely between side plates 124 of assembly 120. A front die carrier 154 and a front knife carrier 156 are slidably mounted or sleeved upon front support rods 150 for movement longitudinally along the rods. Front knife carrier 156 is positioned upon rods 150 by means of a pneumatic motor 158 mounted on one of the side plates 124 and coupled directly to front knife carrier 156 by its piston rod 160. As shown in FIG. 3, piston rod 160 is in its fully extended position with knife carrier 156 at its extreme limit of approach toward front die carrier 154.

In FIG. 3, front die carrier 154 is likewise disclosed at its extreme limit of movement toward front knife carrier 156. Positioning of front die carrier 154 on support rods 150 is accomplished by a pneumatic motor-driven cam assembly designated generally 158. Referring particularly to FIGS. 2, 3 and 9, a pair of collars 160 are fixedly clamped on the respective front support rods 150 and a pair of compression springs 162 are mounted on the front support rods to resiliently bias front die carrier 154 away from the stationary collars 160—i.e. to the left as viewed in FIGS. 2 and 9.

As best seen in FIG. 2, a cam 164 is supported for movement about a pivot 166 mounted on the adjacent side wall 124. A pneumatic motor 168 is pivotally suspended as at 170 from a bracket which likewise is fixedly secured to sidewall 124. The piston rod 174 of motor 168 is pivotally coupled as at 176 to cam 164. Cam 164 is formed with a long radius face 178 and a short radius face 180. Both faces 178 and 180 are flat, the terms "long radius" and "short radius" referring to the radial distance between the axis of pivot 166 and the respective cam faces. Cam 164 is formed with a curved transition portion 182 which extends between the respective faces 178 and 180.

When the piston rod of motor 168 is at its fully retracted position, as shown in FIG. 2, cam 164 is positioned with its long radius face 178 in bearing engagement with the rear surface 184 of front die carrier 154. When piston rod 174 of motor 168 is moved to a fully extended position, cam 164 is rotated about its pivot 166 ninety degrees in a counterclockwise direction from the position shown in FIG. 2. At the conclusion of this rotation, short radius cam face 180 is engaged with surface 184 of front die carrier 154 and, since the radial distance between pivot 166 and surface 180 is less than that between pivot 166 and surface 178, front die carrier 154 is moved to the left from the position shown in FIG. 2 by the compressive force exerted against the die carrier by compression springs 162.

A rear die carrier 186 and a rear knife carrier 188 are mounted upon rear support rods 152. Like front knife carrier 156, rear knife carrier 188 is supported on rods 152 on longitudinal sliding movement upon the rods, rear knife carrier 188 being driven in movement along rods 152 by a pneumatic motor 190 mounted on sidewall 124 and having a piston rod 192 coupled directly to rear knife carrier 188.

Rear die carrier 186 is capable of sliding movement upon rods 152, but this capability is solely for the purpose of initially locating rear die carrier 186 at a selected position of longitudinal adjustment upon rods 152. A threaded stud 194 is coupled between side plate 124 and rear die carrier 186 to fixedly maintain die carrier 186 at its adjusted position.

Referring now particularly to FIG. 5, front die carrier 154 is formed with a downwardly projecting die mounting plate portion 196 which is suitably strengthened as by webs 198. A front die block 200 is detachably mounted upon the face of mounting plate 196 as by bolts, not shown, so that the apparatus may be employed to sever the flash from articles of various configurations by replacing the various die blocks and cooperating knives.

In the drawings, the apparatus is shown as set up to sever the flash from the shoulder portions of plastic bottles B whose shape is best shown in FIG. 1. As seen in FIG. 1, the bottles, which are generally circular in horizontal cross-section, are formed with a conical shoulder portion S with an integrally molded handle H formed on one shoulder. During the molding operation, flash F is formed on the bottle and projects both from the inside and outside of the handle, as well as from the shoulder of the bottle at the side diametrically opposite the handle.

In the apparatus shown in the drawings, front die carrier 154 carries a handle die 202 having a die face 204 within which is formed a recess 206 formed to receive that portion of the handle lying on one side of the general plane of the flash F which projects from the handle. The purpose of recess 206 is to permit the bottle handle to move inwardly beyond the plane of the die face so that edges of the die can engage the flash and surface of the bottle along the lines of juncture at which the flash joins the bottle surface. To this end, recess 206 is bounded by die edges which include an outside handle edge 208 and an inside handle edge 210.

A generally similar structural arrangement is supported on the rear die carrier 186, the downwardly projecting portion 212 of carrier 186 serving as a mounting plate for a rear die block 214 having a die face 216 which terminates at a die edge 218 conformed to the line of juncture of the flash with the bottle shoulder at the side of the shoulder opposite handle H.

Referring now to FIG. 6, front knife carrier 154 carries a front knife block 220 upon which is mounted a front knife assembly which includes an outer handle edge knife 222 and inside handle edge knife 224, knives 222 and 224 being conformed respectively to handle die edges 208 and 210 and being adapted to mate with the edges in the manner best seen in FIG. 10. On rear knife carrier 188, a rear knife block 226 is mounted to support a rear knife 228 which is conformed to mate with edge 218 on rear die 214. Knives 222, 224 and 228 are formed from strip steel stock having a bevelled cutting edge, the knives being formed to the desired shape and fixedly secured to their respective knife blocks by a series of screws as most clearly illustrated at 30 on knife 228 in FIG. 6. On the front face of knife blocks 220 and 226, suitably located pads such as 232 may be mounted to engage the die faces to limit the depth to which the knife edges project into the die.

Referring now to FIG. 10, it is seen that die edges 208 and 210 are bevelled at an angle complementary to the bevel on the cutting edges of knives 222 and 224. When the knife is moved into a flash-severing position, the cutting edge of the knife actually projects beyond the general plane of the die face 204 in the fashion best seen in FIG. 10 to thereby accomplish a shearing-type action to cut the flash from the article.

Die alignment

Die faces 204 and 216 are supported upon their respective carriers so that the die faces lie in respective vertical planes which are perpendicular to the longitudinal extent of their support rods. In some instances, the die faces actually may be recessed somewhat relative to the die edges, and the primary requirement from the standpoint of alignment is that the relationship of the vertical plane in which the die edges lie be accurately located. Recessing of the die faces may be desirable in some instances where relatively thick or bubbled flash is encountered.

The first step in aligning the dies is to locate the vertical plane of rear die edge 218 so that the vertical axis of rotation of platform 60 upon piston rod 62 of motor 64 lies in the vertical plane of rear die edge 218. Rear die edge 218 is horizontally rearwardly offset radially from the axis of rotation of platform 60 by an amount equal to the corresponding radial spacing of the line of juncture of the flash with the rear (handleless) bottle shoulder from the central vertical axis of the bottle.

Front die face 204 is then aligned on its carrier 154 so that when the front die actuating cam 164 is in the position shown in FIG. 2, the vertical plane of handle die edges 208 and 210 lies in the same plane as do rear die edge 218 and the vertical axis of rotation of platform 60. The horizontal or radial spacing of handle die edges 208 and 210 from the vertical axis of rotation of platform 60 corresponds to the horizontal or radial spacing of the corresponding lines of juncture of the flash with the bottle handle and surface from the central vertical axis of the bottle.

However, the vertical relationship between handle die edges 208 and 210 and rear die edge 218 differs from the corresponding relationship between the various lines of juncture of the flash with the surfaces of the bottle.

As best seen in FIGS. 7 and 8, rear die edge 218 is vertically offset upwardly relative to die edges 208 and 210 so that when a bottle handle is seated within recess 206 of handle die 202, rear die edge 218 is spaced vertically upwardly above and out of contact with the line of juncture on the rearward portion of the bottle shoulder. In other words, the die edges are vertically displaced from simultaneous congruence with the corresponding lines of juncture between the flash and bottle surface.

This relationship is employed because experience has shown that slight variations occur due to non-uniform cooling and other effects between bottles, even when the bottles are produced from the same molds. Because of these variations, it has been found desirable to sever the flash from the opposite shoulder portions of the bottle in two separate severing steps rather than simultaneously. In order to accurately register the bottle with the die, the apparatus is so designed that the seating of the bottle in the die, preparatory to the severing step, is determined by the engagement between the bottle surface and the corresponding surface of the die. By seating the opposite shoulder portions separately, variations in the relationship between the two shoulder portions have no effect on the flash severing operation.

The vertically offset relationship between the handle die edges and rear die edge permits a separate seating of the respective surfaces with their corresponding dies. In other words, seating of the bottle against rear die edge 218 is accomplished independently of the step of seating the bottle handle in the handle die. This separate seating action is accomplished in a manner to be described in more detail below by retracting the handle die from the bottle after the flash has been severed from the handle and subsequently elevating the bottle until the bottle shoulder moves into seated engagement with edge 218 of the rear die.

A corresponding relationship exists with the cutting edges of the knives, the knives being aligned to move into mating engagement with their respective die edges.

Pre-orientation of bottles

The vertical plane of the die edges of the apparatus under consideration is disposed in parallel relationship to the direction of movement of articles on the carrying run 38 of the conveyor and is horizontally offset to one side of the carrying run. While the final orientation of the bottle relative to the dies occurs as the bottle is transferred to the dies by the transfer assembly which includes motors 70 and 72, it is necessary to orient the bottle into a predetermined relationship with the dies prior to the transferring of the bottle by motors 70 and 72.

As will become apparent from the following description, the preorienting of the article prior to its engagement by the transfer assembly will depend to some extent upon the configuration of the article. In the particular instance under consideration, the lines of juncture on the opposite side of the vertical axis of the bottle are not symmetrical with each other, and because of this non-symmetrical arrangement, it is necessary to preorient the bottle so that its handle is facing forward with respect to its direction of movement along the conveyor because, as described above, the handle die is supported on the front die carrier. This specific orientation would not be required in the case where the lines of juncture on opposite sides of the bottle were symmetrical.

The bottle under consideration also presents a second problem in that the shoulder portion in the region of the handle has been recessed in a fashion such that the generally conical shoulder portion of the bottle is cut away on the inside of the handle to present an edge or corner at the juncture of the cutaway portion at the interior of the handle with the normal conical surface of the shoulder. In order to prevent possible interference between this last-mentioned corner and the edge of the die, the general plane of the flash which projects from the bottle is angularly preoriented so that during movement into the die, the handle engages the die surface before the shoulder or corner moves beyond the plane of the die face.

Figure 11:
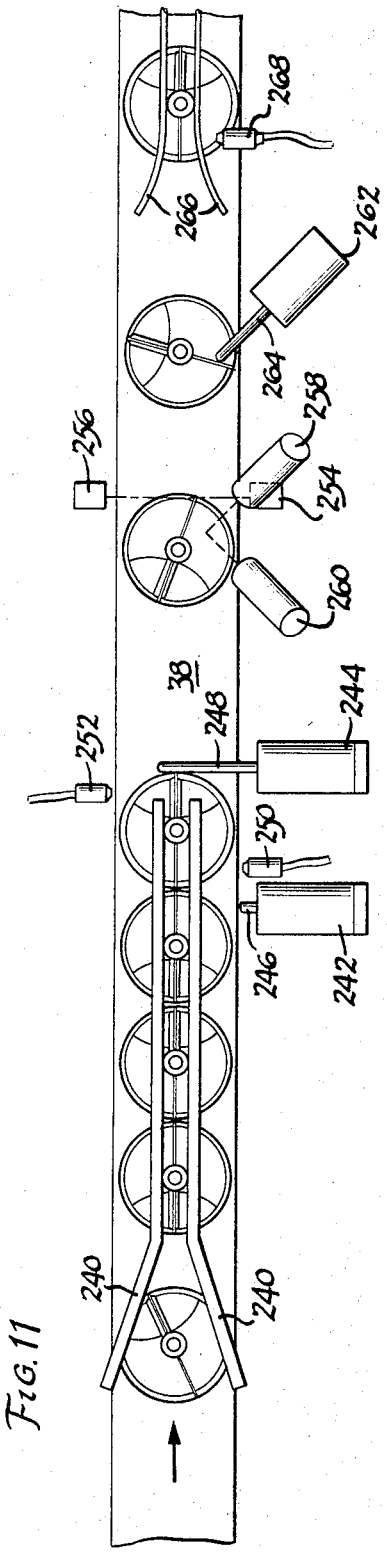
FIGURE 11 is a schematic top plan view of apparatus for orienting articles being fed to the apparatus of FIG. 1.
Figure 12:
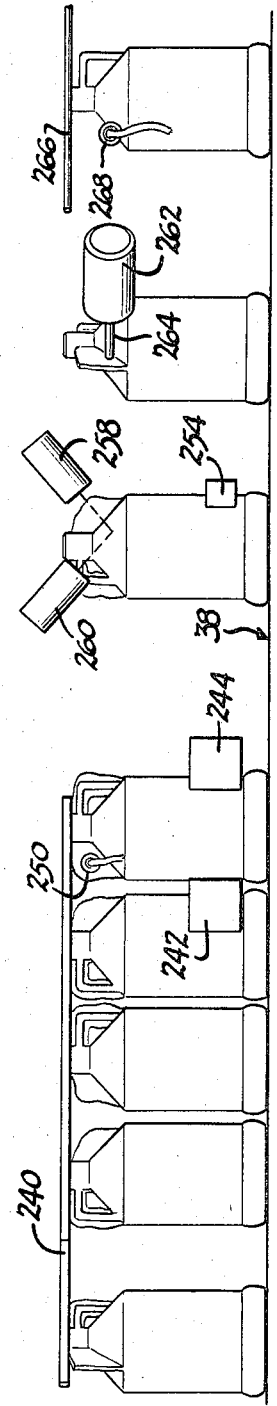
FIGURE 12 is a schematic side elevational view of the apparatus in FIG. 11.

To accomplish the desired directional orientation, a preorienting structure schematically illustrated in FIGS. 11 and 12 is employed.

Bottles to be deflashed are placed upon the carrying run 38 of a conveyor without regard to the orientation of the general plane of the flash on the article. The bottles are fed along conveyor 38 from left to right as viewed in FIGS. 11 and 12 and as they are fed toward the deflashing apparatus, the bottles pass into the converging mouth of a pair of opposed neck guides 240 which are supported above the surface of carrying run 38 of the conveyor at approximately the top of the shoulder portions of the bottle. The two neck guides are spaced from each other by a distance somewhat greater than the thickness of the bottle in this region, but close enough to each other to engage the flash projecting from the bottle to orient the general plane of the flash into a fairly close approximation of parallelism with the direction of movement of the bottle on the carrying run.

Near the downstream end of neck guides 240, a gate is defined by two pneumatic motors 242 and 244 disposed with their respective piston rods 246 and 248 being capable of movement into or out of the path of movement of bottles along the conveyor. The piston rods move in paths perpendicular to the direction of movement of bottles and the spacing between piston rods 246 and 248 is selected to be slightly greater than the bottle diameter.

Movement of piston rod 248 to its fully extended position is employed to stop a bottle on the conveyor at a location where the flash on the bottle is disposed in alignment with a pair of nozzles 250 and 252 which are connected to a source of air under pressure. Nozzles 250 and 252 may conveniently be mounted on opposed neck guides 240, one nozzle being mounted upon each neck guide and located to discharge air under pressure in a jet against the flash on a bottle stop by the extended piston rod 248. As best seen in FIG. 11, the nozzles are spaced longitudinally of the conveyor so that each nozzle is directed on the flash at opposite sides of the vertical axis of the bottle, and thus when air is discharged simultaneously from both nozzles 250 and 252, the pressure of the air jets against the flash on opposite sides of the bottle axis urges the bottle to rotate in a clockwise direction as viewed in FIG. 11 until the flash engages the opposite sides of the neck guide in a position such that the flash is inclined with respect to the direction of movement of the article along the conveyor.

Pneuamtic motor 242 functions to stop the income line of bottles within neck guides 240 at a position clear of the bottle engaged by the extended piston rod 248 to relieve the bottle being rotated by air jets 250 and 252 from the line pressure of incoming bottles and also to provide a means by which one bottle at a time may be released by the retraction of piston rod 248 clear of the path of movement of the bottles.

After being released from neck guides 240, the bottle moves to the right as viewed in FIGS. 11 and 12 until the bottle breaks a light beam from a light 254 located on one side of the conveyor and aimed at a photoelectric cell unit 256 at the opposite side of the conveyor. When the bottle breaks the light beam, the electrical control circuit, in a manner described more fully below, energizes a second light 258 which is supported above and to one side of the path of movement of the bottles to direct a downwardly inclined light beam to strike the bottle on its shoulder surface. A second photoelectric cell 260 is mounted at a location such that if the bottle is proceeding down conveyor 38 with its rear (handleless) side forward, the light beam from light 258 is reflected by the conical bottle shoulder into photocell 260.

Slightly downstream of conveyor 38 from the photocells is a pneumatic motor 262 having a piston rod 264 normally disposed in a retracted position clear of the path of movement of articles along the conveyor. As best seen in FIG. 12, motor 262 is disposed at an elevation approximately level with an intermediate portion of the bottle shoulder and, from FIG. 11, is disposed so that its piston rod 264 is inclined with respect to the direction of movement of bottles along the conveyor. If photocell 260 detects a rearwardly facing bottle, motor 262 is actuated to extend piston rod 264 and rod 264 is projected out into the path of the bottle to a distance such that the flash on the handleless shoulder side is engaged by the tip of the piston rod. The rod holds this portion of the flash stationary and movement of belt 38 causes the bottle to rotate through approximately 180° about its vertical axis so that the directional orientation of the bottle is reversed from handleless shoulder forward to handle forward.

Because of the non-symmetrical conformation of the bottle shoulder, with the cut-out region about its handle, if a bottle with a handle facing forward passes light 258, the beam from light 258 is not reflected onto photocell 260, and in this case motor 262 would not be actuated, because the bottle is proceeding, as desired, with handle forward on the conveyor.

Referring to FIG. 4, as the bottle moves into the deflashing apparatus, a second pair of neck guides 266 engage the bottle neck at an elevation above the flash. While the bottle is held by the extended piston rod 110 of motor 102, an air jet 268 discharges a stream of air against the flash projecting from the shoulder portion to again rotate the bottle about its vertical axis until the plane of the flash is inclined at approximately 45° from the direction of movement of the article along the conveyor. The exact angle of inclination of the flash to the direction of movement along the conveyor is not overly critical. The purpose of this positioning of the general plane of the flash is to assure that the corner or shoulder C of the shoulder recess at the interior of the shoulder is located at an orientation such that as it is moved toward the handle die by the transfer assembly, the corner is located rearwardly of the corresponding portion of edge 210 of the handle die. As will be described in more detail below, during the transferring of the bottle toward the die, the flash projecting from the exterior of the handle engages the face 204 of the die and, as viewed in FIG. 4, during the transferring of the bottle, the aforementioned engagement between the flash and bottle causes the bottle to rotate in a counterclockwise direction as viewed in FIG. 4 to swing the general plane of the flash into coincidence with the plane of the die faces.

*Electrical and pneumatic control circuits*

Figure 18:
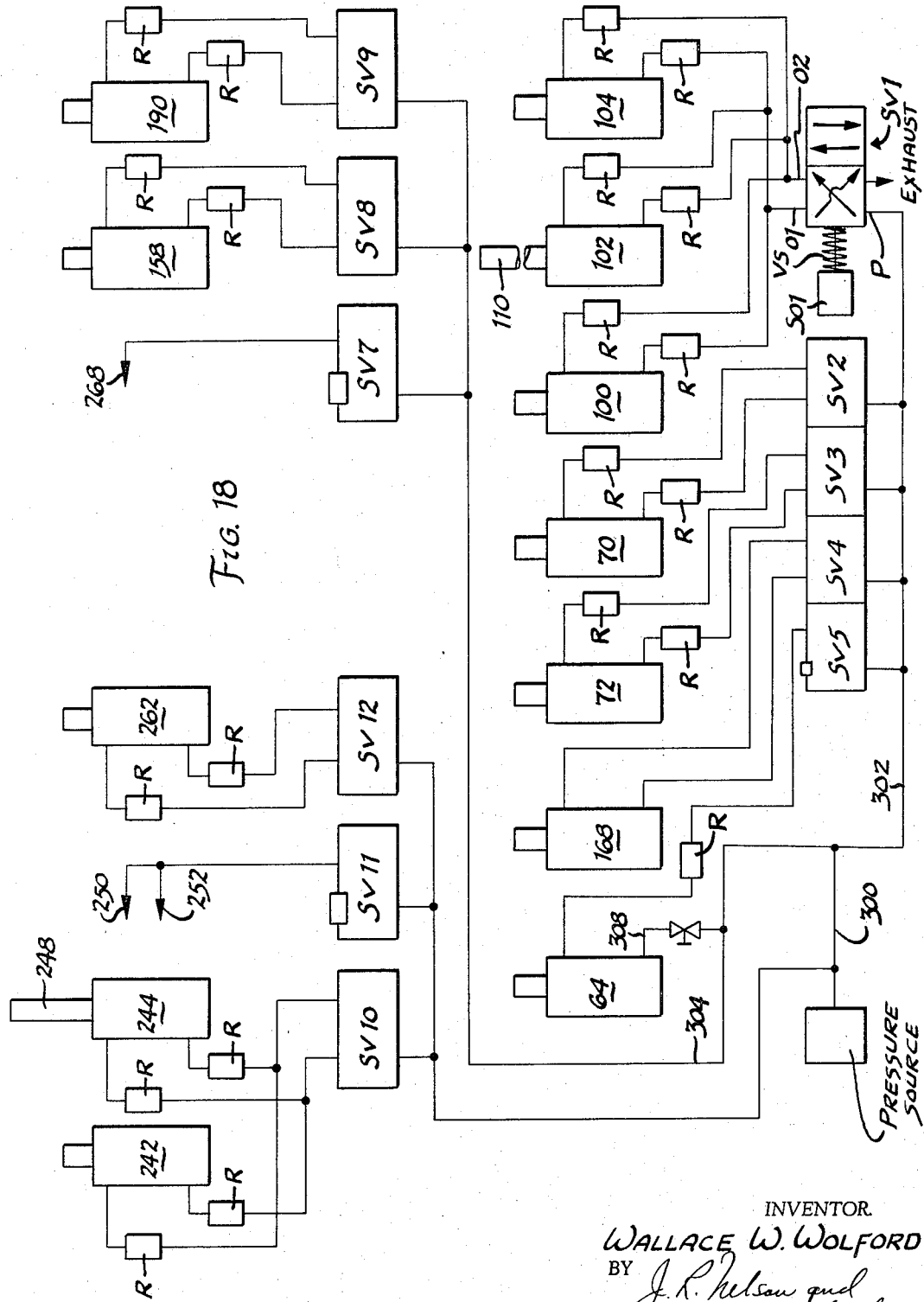
FIGURE 18 is a schematic diagram of the pneumatic control circuit of the apparatus.
Figure 19:
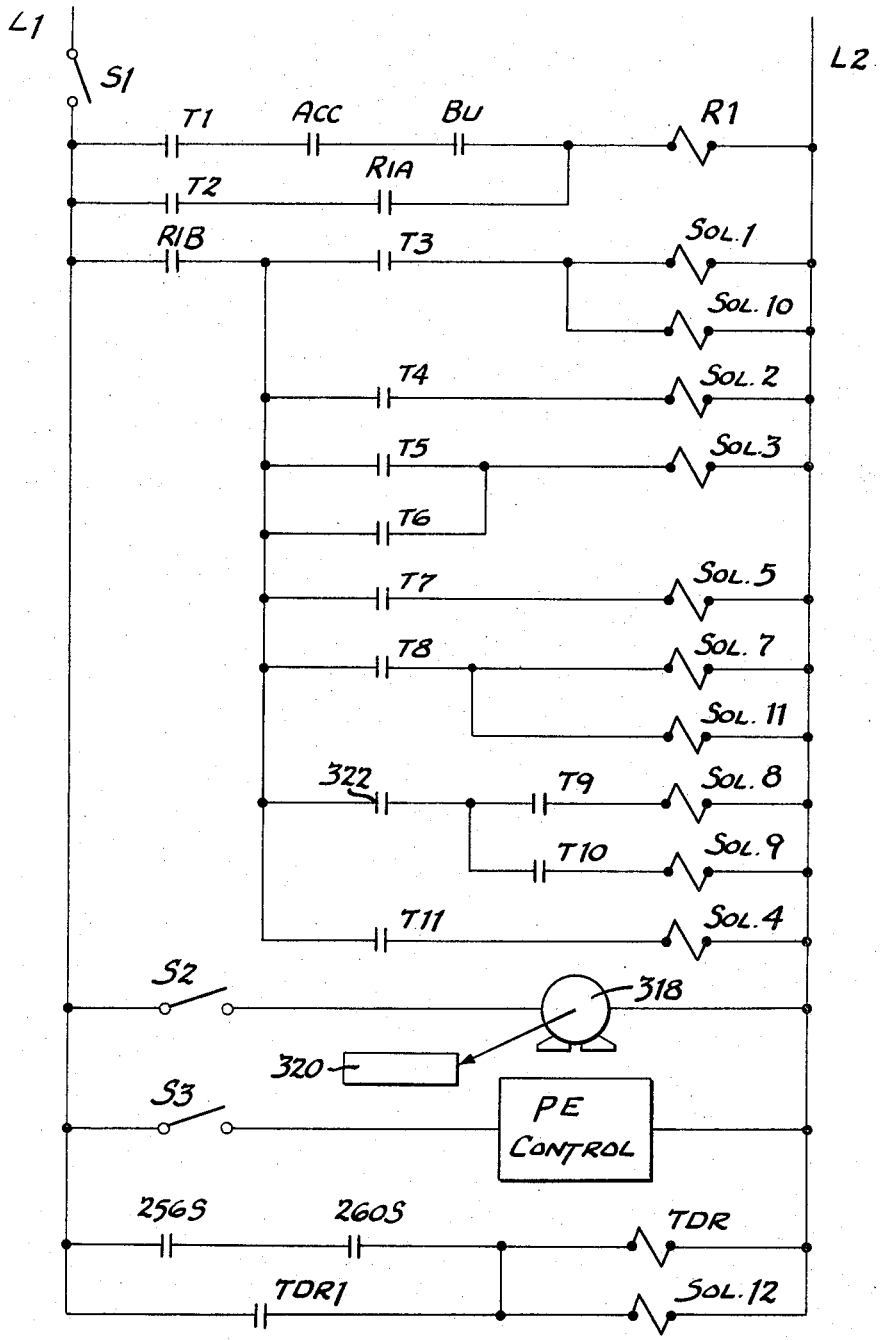
FIGURE 19 is a schematic diagram of the electrical control circuit of the apparatus.

The electrical and pneumatic control circuits employ components of standard commercially available construction, and hence the components have been illustrated only schematically in FIGS. 18 and 19.

Referring first to FIG. 18, the various pneumatic motors described above are controlled by a group of two-position, four-way reversing valves SV1, SV2, SV3, etc. Four-way reversing valves SV1 has been illustrated diagrammatically and includes a pressure port P, an exhaust port EXH and outlet ports 01 and 02. As indicated in FIG. 18, valve SV1 is normally positioned so that its ports are cross-connected as illustrated, pressure port P being connected to outlet port 02 and outlet port 01 being connected to exhaust port EXH. The valve spool is normally biassed to the position illustrated by a spring VS. A valve operating solenoid S01 is coupled to the valve sleeve in a fashion such that when the solenoid coil is energized, the valve is shifted to align the parallel connections with the respective ports to connect pressure port P to outlet port 01 and to connect outlet port 02 to exhaust port EXH. Valves of this particular type are well-known in the art and commercially available. All of the remaining valves of FIG. 22 having reference numerals beginning with the letters SV may be considered to be identical to valve SV1.

The pneumatic control circuit further includes, as shown in FIG. 18, a schematically illustrated pressure source which will normally include suitable pressure regulators, filters, etc., which is connected via pressure conduits 300, 302, 304 and 306 to the pressure ports of all of the four-way reversing valves SV1, SV2, etc.

Valve SV1 controls the three pneumatic motors 100, 102 and 104 which control the movement of bottles along carrying run 38 of the conveyor through the deflashing apparatus. The rod and head end connections of motors 100 and 104 to outlet ports 01 and 02 are reversed from the rod and head end connection of motor 102 to the outlet ports and thus, when the piston rods of motors 100 and 104 are in their normal retracted position, piston rod 110 of motor 102 is in its extended position. The conduits connecting rod and head ends of the pneumatic motors to the four-way reversing valve ports may be provided, as required, with restrictors such as R to control the rate of movement of the piston rods in a manner well-known in the art. It is believed apparent that with actuation of solenoid S01, the connections of valve SV1 will be reversed from that as shown, thereby retracting the piston rod of motor 102 and simultaneously extending the piston rods of motors 100 and 104.

Bottle transfer motors 70 and 72 are respectively controlled by four-way reversing valves SV2 and SV3, which are in turn controlled by solenoids S02 and S03 respectively, not shown in the pneumatic diagram but appearing in the electrical circuit of FIG. 19.

Handle die carrier control motor 168 is controlled by valve SV4, valve SV4 being controlled in turn by a solenoid S04 (FIG. 19).

Platform elevating motor 64 is controlled by solenoid control valve SV5 which has one of its outlet ports, that corresponding to 01 of solenoid SV1, blocked. When valve SV5 is in the normal set of connections, corresponding to those illustrated at SV1, pressure is supplied via valve SV5 to the rod end of motor 64. Pressure is also continuously supplied to the head end of motor 64 via a branch conduit 308 connected to pressure conduit 304 and having an adjustable pressure-regulating valve 310. Pressure regulator 310 is so adjusted that the pressure applied to the head end of motor 64 is quite low so that when valve SV5 is reversed to vent the head end of motor 64, the pressure applied to extend the piston rod of motor 64 via conduit 308 is very small; a restrictor R in the rod end conduit to motor 64 regulates the rate at which the rod end is vented so that a very small and slowly applied pressure urges the piston rod of motor 64 towards its extended position. Valve SV5 is controlled by a solenoid S05 (FIG. 19).

Valve SV7 controls the supply of air to jet 268 which is employed to rotate bottles as the bottles are halted by the extended piston rod of motor 102 at the entrance to the deflashing station. Like valve SV5, valve SV7 has one outlet port blocked and, in effect, functions as a two-way valve only. Valve SV7 is controlled by a solenoid S07 (FIG. 19).

Handle knife motor 158 is controlled by a four-way reversing valve SV8, while rear shoulder knife motor 190 is controlled by four-way valve SV9. These last two valves are respectively controlled in turn by solenoids S08 and S09 (FIG. 19).

Motors 242 and 244 which control the flow of bottles at the preorienter (FIGS. 11 and 12) are controlled by a single four-way valve SV10, the connections of motors 242 and 244 to the outlet ports of the valve being reversed so that when motor 244 has its piston rod 248 extended, as indicated in FIG. 22, the piston rod of motor 242 is retracted. Valve SV10 is controlled by a solenoid S010 (FIG. 19).

Preorienting jets 250 and 252 are controlled from a solenoid valve SV11, the connections being identical to those to jet 268. Solenoid S011 (FIG. 19) controls valve SV11.

Bottle turning motor 262, associated with the preorienter, is controlled by a solenoid valve SV12 in the conventional manner, solenoid S012 (FIG. 19) operating valve SV12.

The solenoids which control the respective four-way valves of FIG. 18 are connected into an electric circuit in the manner shown in FIG. 19. The respective solenoids are connected across electrical supply lines L1 and L2 of suitable voltage through various cam operated switches T1–T12 inclusive. The sequence of operation of the various solenoids is a timed sequence in which the various solenoid energizing switches are energized in the desired sequence by switch operating cams driven in constant speed rotation by a motor 318, cam-operated switch banks of this nature being conventional and therefore indicated only schematically at 320.

In addition to the cam operated switches controlled by constant speed motor 318 and cams 320, three manually actuated switches S1, S2 and S3 are connected in the circuit as shown, switch S1 being a master switch. Switch S2 energizes constant speed motor 318, while switch S3 is employed to control the photoelectric cell circuit, designated schematically PE control, associated with photocells 256 and 260 in the preorienting apparatus (FIGS. 11 and 12).

A master control relay R1 is connected in the control circuit, and, when energized, causes normally open contacts R1A and R1B to close. Connected in the initial energizing circuit for relay R1 is an accumulation switch ACC which may be controlled by one or more detecting devices arranged on the machine at suitable locations to make sure that a sufficient supply of bottles are present at the inlet end of the preorienter. A back-up switch BU may be employed to automatically stop operation of the machine if deflashed bottles back up at the outlet end of the apparatus.

A safety switch 322 is connected in the control circuit to solenoids S08 and S09 which control the knife-actuating motors to prevent actuation of the knife motors in the event no bottle is present in the die.

Contacts 256S and 260S are respectively controlled by photocells 256 and 260. Contact 256S is closed when the light beam to photocell 256 is interrupted by a bottle on the conveyor, while conduit 260S is closed when the beam of light from light 258 is reflected by a rearwardly facing bottle into photocell 260. When contacts 256S and 260 are simultaneously closed, a time delay relay TDR is energized to close contacts TDR1 to maintain bottle rotating motor control solenoid S012 energized for a pre-determined time interval to rotate the rearwardly facing bottle into a forwardly facing orientation on the conveyor.

*Transferring and flash severing*

Assuming that the various parts of the transfer mechanism are in a position to receive a bottle, referring briefly to FIG. 4 withdrawal of piston rod 110 from the FIG. 4 position permits the bottle previously engaged by the piston rod to be carried by the carrying run of the conveyor to the right as viewed in FIG. 4 until the bottle engages the extended piston rod 112. As the bottle engages piston rod 112, the bottle, transfer mechanism and die knife assembly will have their various components positioned as shown in FIGS. 13A and 13B, from which piston rod 112 and its motor 104 have been omitted for the sake of clarity.

Figure 13A:
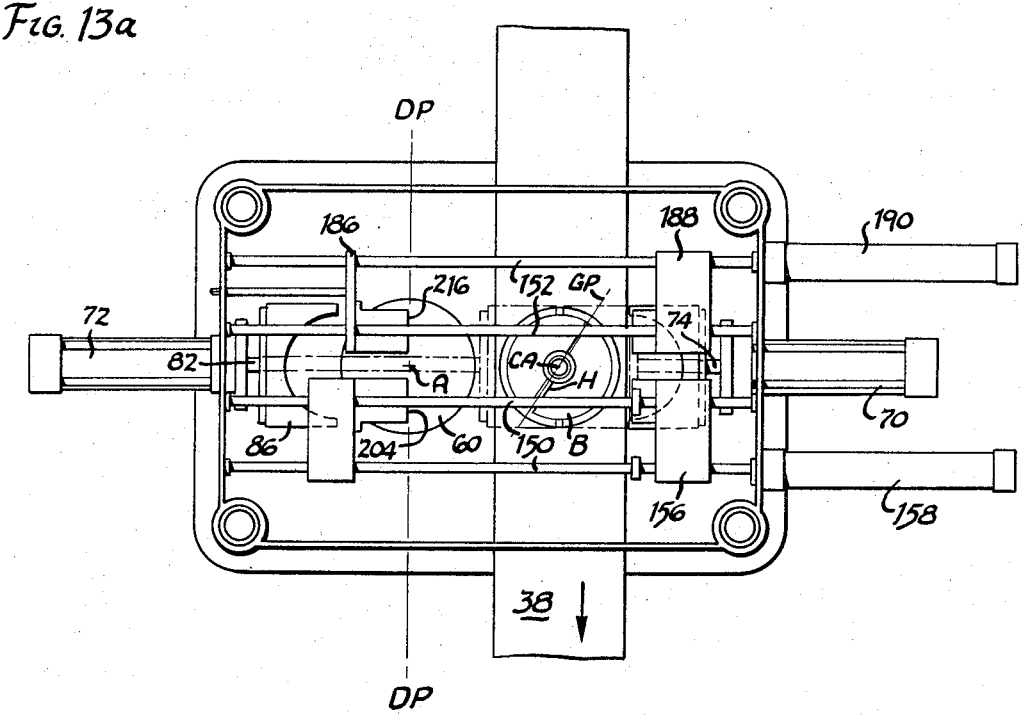
FIGURES 13A and 13B are simplified top and end views of the die knife assembly showing the positions of the parts upon the location of an article in a ready position with respective to the die-knife assembly.

Referring first to FIG. 13A, the bottle is now in what may be described as a "ready" position in which the general plane of the flash on the bottle, designated GP in FIG. 13A, is inclined toward the vertical plane of the die edges indicated at line DP—DP, the axis of rotation A of platform 60 lying in the plane of the die edges DP. Piston rod 112 is so located that at this time the central axis CA of the bottle lies in a vertical plane which is perpendicular to plane DP—DP and intersects plane DP—DP at the axis A of rotation of platform 60. The bottle handle is disposed on the same side of the platform axis-bottle axis plane as is the handle die.

Figure 13B:
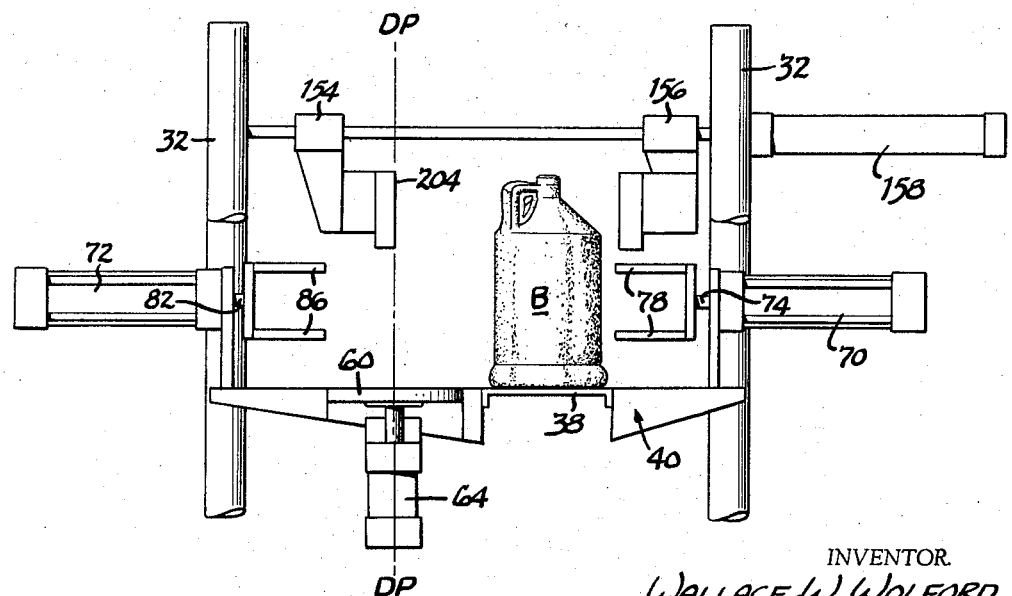

At this stage, the piston rods of both transfer motors 70 and 72 are shown in full in FIGS. 13A and 13B in their fully retracted position, transfer plates 78 being retracted clear of conveyor 38. Handle die carrier 154 is positioned at its forward limit of travel to dispose the handle die edges in plane DP—DP, while both of knife carriers 156 and 188 are at their extreme retracted positions. Referring to FIG. 13B, platform 60 is at its extreme lower limit of movement in which its upper surface is coplanar with the surface of carrying run 38 of the conveyor.

As the first step in the transfer operation, motors 70 and 72 are actuated, by the electrical and pneumatic control circuits to be described below, to extend their respective piston rods to the position shown in dotted line in FIGS. 13A and 13B, at which the bottle is loosely gripped between transfer plates 78 and 86. The control circuit then reverses the penumatic connections to motor 72 and its piston rod begins to retract—i.e. move to the left, as viewed in FIGS. 13A and 13B, while the piston rod of motor 70 continues to drive in the same direction—i.e. toward the left, so that transfer plates 78 follow the retracting transfer plates 86, maintaining the same relationship to the bottle.

This movement shifts the bottle from the position shown in FIGS. 13A and 13B toward die faces 204 and 216, the bottle moving to the left off the carrying run 38 of the conveyor, and onto the upper surface of platform 60.

Figure 14A:
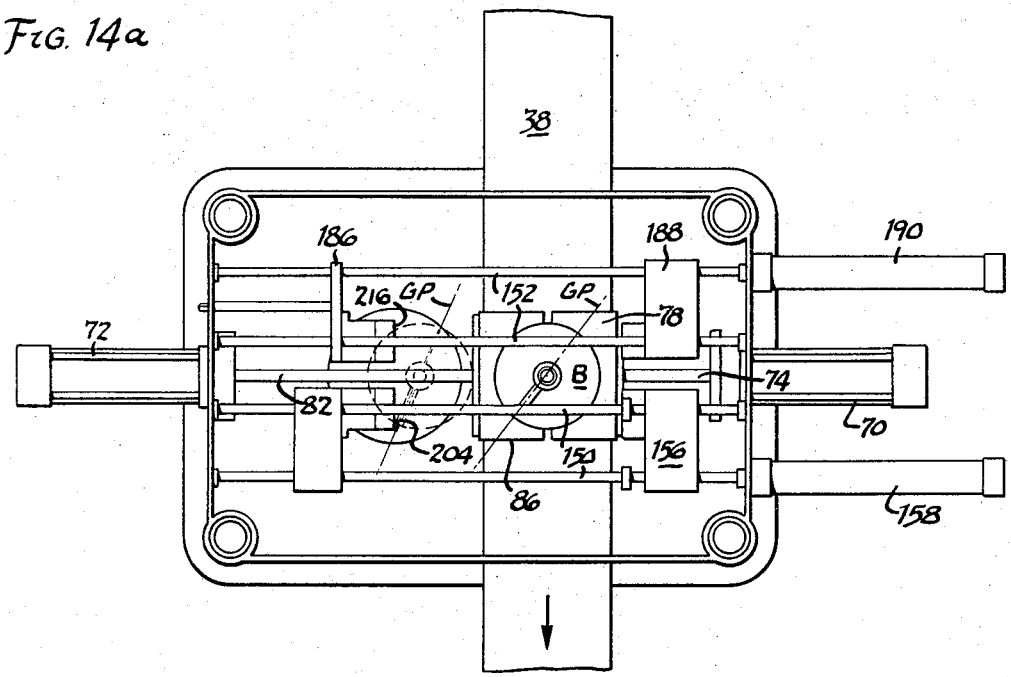
FIGURES 14A and 14B are simplified top and end views of the die-knife assembly showing the first stage of the transfer of an article from the ready position of FIGS. 13A and 13B into operative relationship with the die-knife assembly.
Figure 14B:
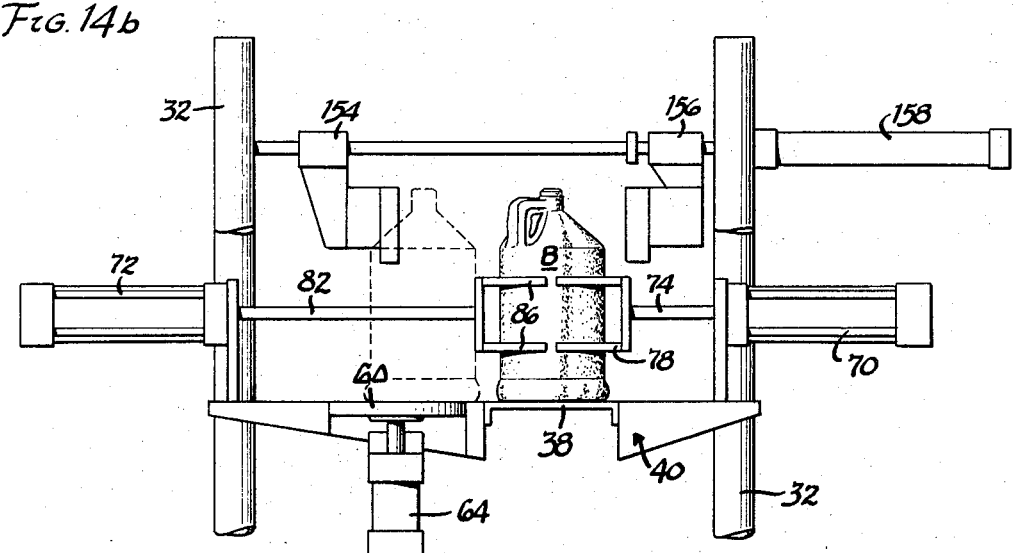

As the bottle approaches the dies, referring now to FIGS. 14A and 14B, the flash which projects from the outside of the handle is carried into engagement with die face 204, because of the inclination of the general plane of the flash on the bottle with respect to its direction of movement. As motor 70 continues to stroke to the left as viewed in FIGS. 14A and 14B, the bottle, which is now supported on platform 60, is urged to rotate since that portion of the flash engaged with die face 204 can no longer move toward the left while the bottle as a whole is still being driven to the left by the extending of the piston rod of motor 70. Since the bottle is supported upon the platform, and platform 60 is free to rotate about its axis, the continued translatory movement of the bottle to the left results in the rotation of platform 60 in a direction such that the general plane GP of the flash is swung into parallelism with the die face plane DP—DP. FIGS. 14A and 14B show the bottle halfway through this rotary movement.

The bottle is free to partake of the rotary movement described above because transfer plates 86 and 78 do not grip the bottle tightly. Further, at a point in time just subsequent to the initial movement of the bottle onto platform 60, motor 64 is actuated to slowly elevate the bottle as it is being moved to the left by the transfer mechanism. Thus, by the time the flash initially engages die face 204, the upper surface of platform 60 has been elevated just slightly above the surface of table 54 so that the only resistance to rotation of the bottle is that presented by bearing assembly 68 on the piston rod of motor 64. The substantial extent to which transfer plates 78 and 86 encompass the periphery of the bottle is to assure that the bottle axis is confined to move in a straight line toward the axis A of rotation of platform 60.

The transferring stroke of motors 70 and 72 is regulated so that the stroke is completed when the central axis CA of the bottle arrives in coincidence with the axis of rotation of platform 60. At this time, the general plane of the flash GP has likewise been moved into coincidence with the die face plane DP—DP. It will be appreciated that because of the finite thickness of the flash on the bottle and, in some cases, the presence of bubbles in the flash, exact and precise coincidence between the planes and axes as described above is not always achieved. However, because the final position of the bottle relative to the die is determined by the engagement of the die edges with the surface of the bottle adjacent the line of juncture of the bottle and flash, the minor effect of the thickness of the flash or variations in the flash does not have any practical effect on the flash-severing operation.

Referring now briefly to FIG. 5, handle die 202 is formed with a recess 206 in its face 204, recess 206 being bounded by die edges 208 and 210 which are conformed respectively to the lines of juncture of the flash at the inside and at the outside of the bottle handle. During movement of the bottle from the position of FIGS. 13A and 13B to the point at which the general plane of the flash on the bottle has been moved into (substantially) coincidence with the die face plane DP—DP, the bottle partakes of a complex motion made up of three different components. The first component is one of straight line horizontal movement which is imparted to the bottle by the action of motors 70 and 72. The second component of motion is that of rotation about a vertical axis, this rotation being induced by the flash of the bottle striking die face 204 at a point in time when the bottle axis is still free to move horizontally under the action of motors 70 and 72. The third component of motion is that of straight line vertical motion which is imparted to the bottle by the elevation of platform 60. Once the flash engages die face 204 the bottle moves in all three of the above described modes simultaneously.

The total amount of straight line horizontal motion to which the bottle is subjected is determined mechanically by the regulation of the stroke of motor 70. The total amount of rotation of the bottle about its vertical axis is also primarily dependent upon the stroke of motor 70.

The amount of vertical movement imparted to the bottle is, however, determined by the engagement between the bottle and the downwardly facing portions of die edges 208 and 210. The amount of pressure applied to motor 68 to elevate the bottle as it is being moved into the die is very small and, in fact, is low enough so that when an upwardly facing surface on the bottle adjacent the line of juncture engages a downwardly facing surface of recess 206 adjacent a die edge, the pressure exerted by motor 64 is overcome and further vertical movement of the bottle does not occur.

In the foregoing manner, the bottle handle is moved into seated engagement with handle die 202 in a path which may best be described as a sort of upward spiralling movement.

As will be recalled from the description above relating to the relative positions of the respective dies, at the conclusion of the transferring movement into the dies, the bottle handle is seated in handle die 202, while the rear bottle shoulder is vertically spaced downwardly below edge 218 of rear shoulder die 214. At this particular time, the parts are in the position as shown in FIGS. 15A and 15B, the vertical relationship between the bottle and dies being that shown in FIG. 7.

Figure 15A:
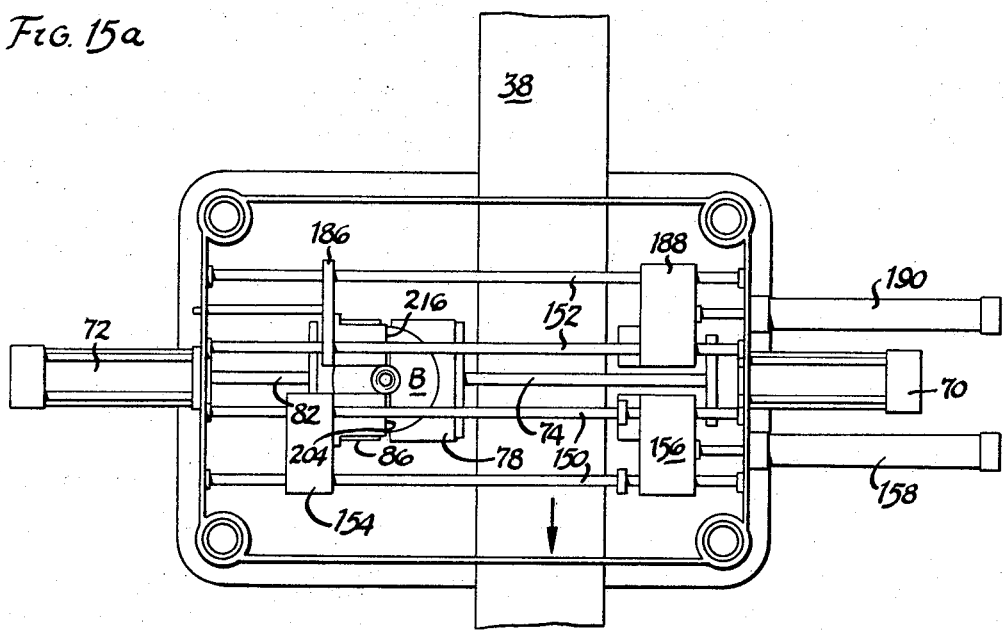
FIGURES 15A and 15B are simplified top and end elevational views of the die-knife assembly showing the bottle located in operative relationship with the handle die.
Figure 15B:
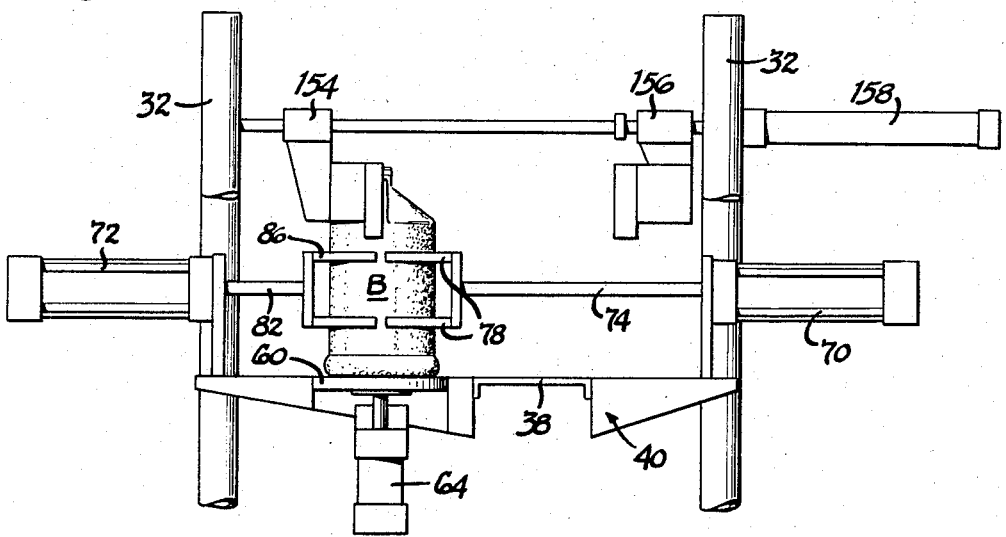
Figure 16A:
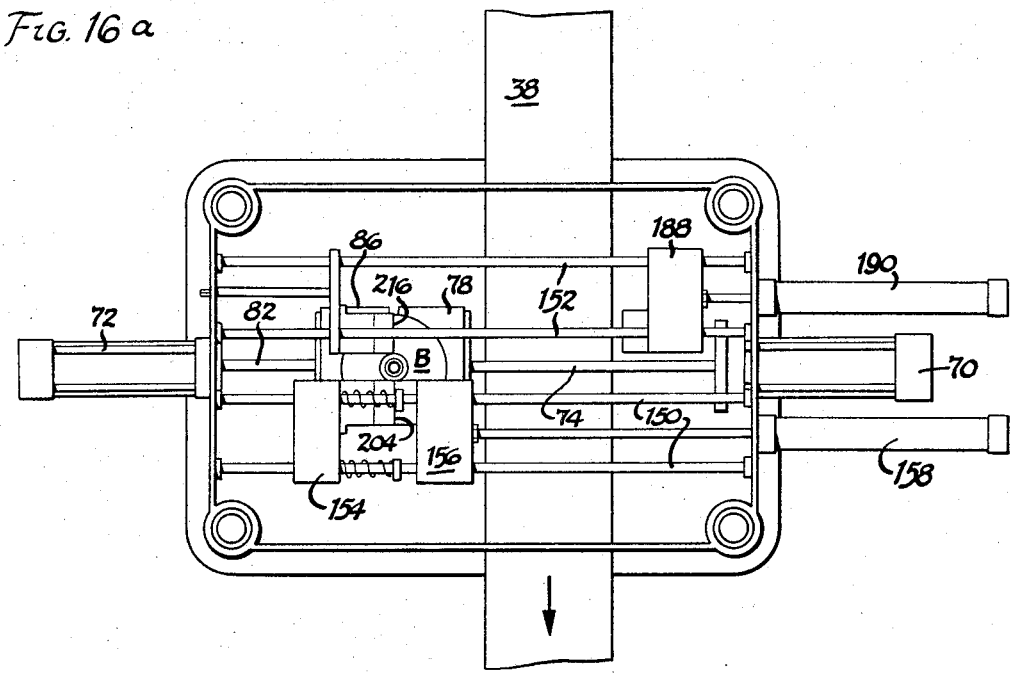
FIGURES 16A and 16B are simplified top and end elevational views showing the handle knife in mated engagement with the handle die at the moment of severing the flash from the handle portion of the bottle.
Figure 16B:
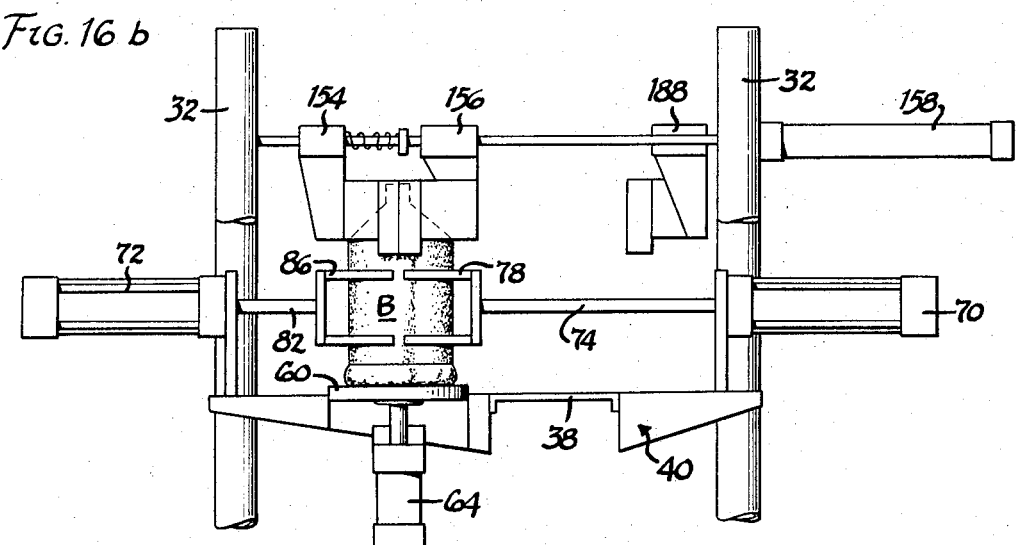

Referring now to FIGS. 16A and 16B, handle knife motor 158 is actuated to drive the handle knife from the retracted position illustrated in FIGS. 15A and 15B to its actuated position shown in FIGS. 16A and 16B during which movement the handle knife cutting edges pass through the flash around the handle and into mating engagement (FIG. 10) with the corresponding edges of the handle die, thus severing the flash from the handle along the respective lines of juncture inside and outside the handle. Motor 158 is then actuated to return handle knife carrier 156 to its original position as shown in FIG. 15A.

Figure 17A:
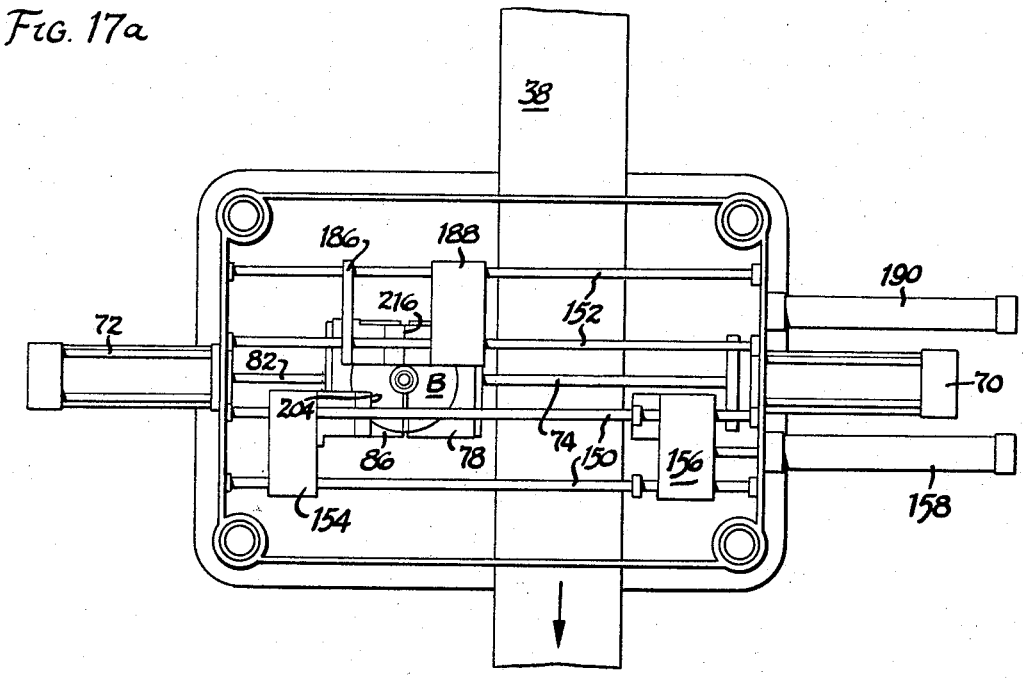
FIGURES 17A and 17B are simplified top and end elevational views of the die-knife assembly showing the positions of the parts at the moment of severing the flash from the rear shoulder portion of the article.
Figure 17B:
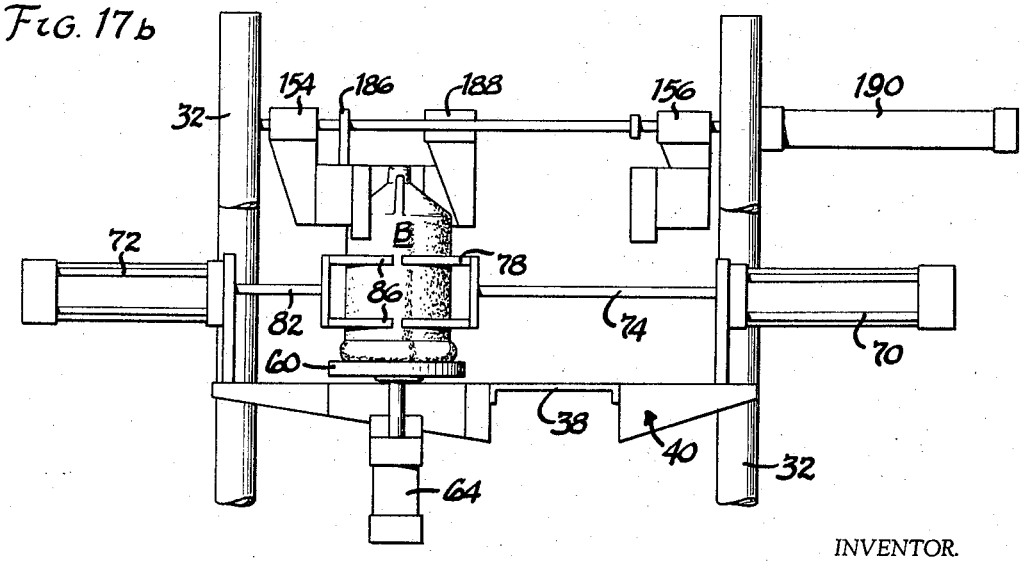

During the retracting movement of knife carrier 156, handle die motor 168 is actuated to extend its piston thereby shifting cam 164 to position the short radius section of the cam in engagement with the rear side of handle die carrier 184. As this action takes place, as described above, springs 162 resiliently bias handle die carrier 184 to the left from the FIG. 16 position to the retracted position in which handle die carrier 154 is shown in FIGS. 17A and 17B.

As the handle die carrier is retracted to the left out of die face plane DP—DP, die face 204 is retracted clear of the bottle handle. This retracting movement releases the downward force exerted by the downwardly facing portions of the handle die edges and thereby permits motor 64 to elevate platform 60 until the rear shoulder of the bottle is seated against rear die edge 218. This positions the bottle vertically relative to the respective dies in the position illustrated in FIG. 8, the handle die in FIG. 8 being retracted in a direction away from the observer clear of the bottle at this time.

Motor 190 is then actuated to drive rear knife carrier 188 to its forward position in which the rear knife edge is in mated engagement with the die edge, thereby severing the flash from the rear shoulder of the bottle. After the severing operation, rear knife carrier 188 is returned to its original position by retracting the piston rod of motor 190.

At this time, the flash has been severed from both the handle and rear shoulder sides of the bottle. Motor 64 is then reversed to lower platform 60 to its original position and motors 70 and 72 are simultaneously actuated to horizontally shift the bottle from platform 60 back onto carrying run 38 of the conveyor. During this operation, piston rod 74 of motor 70 is returned to its fully retracted position (that of FIGS. 13A and 13B) while motor 72 drives its transfer plates 86 to the right a distance sufficient to locate the bottle on the conveyor and then is reversed to again withdraw transfer plates 86 to the FIGS. 13A-B position. During the above movement, motor 168 is again actuated to return rear die carrier 154 to its forward position wherein die face 204 is disposed in plane DP—DP.

Motor 104 has been actuated at any suitable point during the transfer and severing operation so that as the deflashed bottle is returned to carrying run 38 of the conveyor, piston rod 112 has been retracted clear of the conveyor and the deflashed bottle is carried by the conveyor out of the deflashing station. Motor 104 is then again actuated to move its piston rod 112 into the path of movement of bottles along carrying run 38 and piston rod 102 is retracted to release the next bottle for movement down into engagement with piston rod 105, thereby conditioning the apparatus to repeat the deflashing cycle described above.

While the apparatus as described above has been specifically disclosed as being employed to deflash bottles in which the lines of juncture with the flash on the bottles are non-symmetrical on opposite sides of the bottle centerline, it is believed apparent that the invention is equally applicable to bottles or other articles where the lines of juncture are symmetrically disposed on opposite sides of the article centerline. Because of the variation in individual articles, even those produced successively from the same mold, accurate severing of the flash can be achieved in all cases only by orienting the surface to be cut by employing that surface to determine the position of the article relative to the severing apparatus, and reorienting the bottle in this manner for each individual surface to be cut. Even in the case of symmetrical bottles, it is desirable to separately orient the bottle in the same fashion as described above to sever the flash on either side of the bottle centerline in two steps.

While I have described an exemplary embodiment of my invention, it will be apparent to those skilled in the art that the apparatus as disclosed may be modified. Therefore, the foregoing description is to be considered exemplary rather than limited, and the true scope of the invention is that defined in the following claims.

I claim:

1. Apparatus for removing flash from the shoulder portions of molded bottles wherein the flash projects from a line of juncture with the bottle shoulder in a vertical general plane containing the vertical axis of the bottle, comprising a platform mounted for free rotation about a vertical axis, die means supported above said platform and having a die face terminating at a die edge conformed to said line of juncture and lying in a vertical plane containing said axis of rotation of said platform in the same relationship to said platform axis as that between said line of juncture and said bottle axis, platform elevating means for raising and lowering said plateform between lower and upper end limits at which the line of juncture of a bottle supported on said platform is disposed respectively below or above said die edge, horizontal transfer means operable when said platform is at said lower end limit for shifting a bottle with flash thereon onto said platform and subsequently shifting the bottle on the platform to move the bottle axis into coincidence with the platform axis, means operable upon the movement of a bottle onto said platform for operating said elevating means to elevate the platform until the bottle shoulder adjacent the line of juncture is seated against the die edge, and knife means having a cutting edge conformed to said line of juncture operable upon the seating of said bottle shoulder against said die edge to sever said flash from said bottle along said line of juncture.

2. Apparatus for removing flash from the shoulder portions of molded bottles wherein the flash projects from a line of juncture with the bottle shoulder in a vertical general plane containing the vertical axis of the bottle, comprising a platform mounted for free rotation about a vertical axis, die means supported above said platform and having a die face terminating at a die edge conformed to said line of juncture and lying in a first vertical plane containing said axis of rotation of said platform in the same relationship to said platform axis as that between said line of juncture and said bottle axis, platform elevating means for raising and lowering said platform between lower and upper end limits at which the line of juncture of a bottle supported on said platform is disposed respectively below or above said die edge, conveying means for advancing a bottle to a ready position at one side of said platform wherein the bottle axis is disposed in a second vertical plane intersecting said first vertical plane at said platform axis, horizontal transfer means operable when said platform is at said lower end limit for shifting a bottle from said ready position onto said platform and subsequently shifting the bottle on the platform while maintaining the bottle axis in said second plane to move the bottle axis into coincidence with the platform axis, means operable upon the movement of a bottle onto said platform for operating said elevating means to elevate the platform as the bottle axis is moved into alignment with the platform axis until the bottle shoulder adjacent the line of juncture is seated against the die edge, and knife means having a cutting edge conformed to said line of juncture operable upon the seating of said bottle shoulder against said die edge to sever said flash from said bottle along said line of juncture.

3. Apparatus for removing flash from the shoulder portions of molded bottles wherein the flash projects from a line of juncture with the bottle shoulder in a vertical general plane containing the vertical axis of the bottle and with the line of juncture extending transversely at one side of said bottle axis comprising a platform mounted for free rotation about a vertical axis, die means supported above said platform and having a die face terminating at a die edge conformed to said line of juncture and lying in a first vertical plane containing said axis of rotation of said platform in the same relationship to said platform axis as that between said line of juncture and said bottle axis, platform elevating means for raising and lowering said platform between lower and upper end limits at which the line of juncture of a bottle supported on said platform is disposed respectively below or above said die edge, conveying means for advancing a bottle to a ready position at one side of said platform wherein the bottle axis is disposed is a second vertical plane normal to said first vertical plane and intersecting said first vertical plane at said platform axis, means on said conveying means for orienting a bottle thereon to locate the general plane of the flash on said bottle in a vertical plane inclined from the bottle axis generally toward said die edge, horizontal transfer means operable when said platform is at said lower end limit for shifting a bottle from said ready position onto said platform and subsequently shifting the bottle on the platform while maintaining the bottle axis in said second plane to move the bottle axis into coincidence with the platform axis, said die face being engageable with said flash during movement of said bottle by said horizontal transfer means to cause said bottle to rotate to bring the general plane of the flash into parallelism with said first plane as said bottle axis moves into coincidence with said platform axis, means operable upon the movement of a bottle onto said platform for operating said elevating means to elevate the platform until the bottle shoulder adjacent the line of juncture is seated against the die edge, and knife means having a cutting edge conformed to said line of juncture operable upon the seating of said bottle shoulder against said die edge to sever said flash from said bottle along said line of juncture.

4. Apparatus for removing flash from the shoulder portions of molded bottles wherein the flash projects from first and second lines of juncture with the bottle shoulder at opposite sides of said bottle in a vertical general plane containing the vertical axis of the bottle, comprising a platform mounted for free rotation about a vertical axis, die means supported above said platform and having separate die faces terminating at respective first and second die edges conformed to said first and said second lines of juncture, means for locating said die faces in a first position wherein said first and second die edges are located in a common vertical plane containing said axis of rotation of said platform in the same horizontally spaced relationships to said platform axis as those between the corresponding lines of juncture and said bottle axis and with the second die edge vertically offset upwardly relative to said first die edge as compared to the vertical relationship between the first and second lines of juncture, platform elevating means actuable in raise or lower said platform from and to a lower end limit at which the lines of juncture of a bottle supported on said platform are disposed in vertically spaced relationship below their corresponding die edges, means for locating a bottle in a ready position at one side of said platform with the bottle axis and platform axis lying in a second vertical plane with said first line of juncture lying on the same side of said second plane as said first die edge, horizontal transfer means operable when said platform is at said lower end limit for shifting a bottle from said ready position onto said platform and subsequently shifting the bottle on the platform to move the bottle axis into coincidence with the platform axis, actuating means operable upon the movement of a bottle onto said platform to actuate said elevating means to elevate the platform until the bottle shoulder adjacent the first line of juncture is seated against the first die edge, first knife means having a cutting edge conformed to said first line of juncture operable upon the seating of said bottle shoulder against said first die edge to sever said flash from said bottle along said first line of juncture, means operable subsequent to the severing of said flash along said first line of juncture for retracting said first knife and first die edge clear of said bottle, said actuating means being operable upon the retraction of said first die edge to actuate said elevating means to elevate said platform until the bottle shoulder adjacent said second line of juncture is seated against said second die edge, and second knife means having a cutting edge conformed to said second line of juncture operable upon the seating of said bottle shoulder against said second die edge to sever said flash from said bottle along said second line of juncture.

5. Apparatus for removing flash from the shoulder portions of molded bottles or like articles wherein the flash projects at an angle from the article surface in a general plane from a line of juncture with the article surface, comprising a die having a flat surface terminating at a die edge conformed to the line of juncture and lying in a first plane, knife means having a cutting edge adapted to mate with said die edge, means for advancing an article with flash thereon into an operative relationship with said die determined by the concurrent engagement of one side of said flash with said flat surface of said die and of said die edge with the article surface in adjacent congruency with the line of juncture, and means operable upon the location of an article in said operative relationship with said die for driving said knife means through the flash at the line of juncture into mating engagement with said die edge.

6. Apparatus for removing flash from the shoulder portions of molded bottles or like articles wherein the flash projects from the article in a general plane from a line of juncture with the article surface, comprising a die having a face adapted to engage the flash on an article and terminating at a die edge conformed to the line of juncture and lying in a first plane, knife means having a cutting edge adapted to mate with said die edge, means for locating an article with flash thereon in a ready position wherein said article is spaced from said die edge in a first direction normal to said first plane and the line of juncture on said article is offset outwardly of said die beyond said die edge in a direction normal to said first direction, means for advancing an article from said ready position into an operative relationship with said die determined by the concurrent engagement of said flash with said die face and said die edge with the article surface in adjacent congruency with the line of juncture, and means operable upon the location of an article in operative relationship with said die for driving said knife means through the flash at the line of juncture into mating engagement with said die edge.

7. Apparatus for removing flash from the shoulder portions of molded bottles or like articles wherein the flash projects from the article in a general plane from a line of juncture with the article surface extending transversely of an axis of the article lying in said general plane, comprising a die having a face adapted to engage the flash on an article and terminating at a die edge conformed to the line of juncture and lying in a first plane in the same relationship to an imaginary reference line in said plane as that of said line of juncture to said article axis, knife means having a cutting edge adapted to mate with said die edge, means for locating an article with flash thereon in a ready position with said article axis and said reference line lying in a common plane normal to said first plane and with the general plane of the flash inclined toward said first plane, means for advancing an article from said ready position into an operative relationship with said die determined by the concurrent face to face engagement of said flash with said die face and the engagement of said die edge with the article surface in adjacent congruency with the line of juncture, and means operable on location of an article in operative relationship with said die for driving said knife means through the flash at the line of juncture into mating engagement with said die edge.

8. Apparatus for removing flash from the shoulder portions of molded bottles or like articles wherein the flash projects from the article in a general plane from a line of juncture with the article surface extending transversely of an axis of the article lying in said general plane, comprising a die having a face adapted to engage the flash on an article and terminating at a die edge conformed to the line of juncture and lying in a vertical plane in the same relationship to an imaginary reference line in said vertical plane as that of said line of juncture to said article axis, knife means having a cutting edge adapted to mate with said die edge, means for locating an article with flash thereon in a ready position horizontally spaced from said die with the line of juncture on the article vertically offset below the die edge and lying in a plane angularly inclined to the vertical plane of the die edge, transfer means for advancing an article with flash thereon into an operative relationship with said die determined by the concurrent face to face engagement of said flash with said die face and the engagement of said die edge with the article surface in adjacent congruency with the line of juncture, and means operable upon location of an article in operative relationship with said die for driving said knife means through the flash at the line of juncture into mating engagement with said die edge.

9. An article holding and deflashing device for use with apparatus for moulding a hollow article having a neck at one end, said device comprising a pair of complementary jaws; means for supporting said article with its neck between said jaws; means mounting said jaws for relative movement from a first position out of holding relation with said neck to a second position in holding relation with said neck; means operable in response to relative movement of said jaws toward said second position to deflash said neck; and means for effecting said relative movement of said jaws.

10. The construction set forth in claim 9 wherein one of said jaws is larger than the other for telescopingly accommodating the other of said jaws as said jaws move relatively toward said second position, the edges of said larger jaws constituting the means to deflash said neck.

11. The construction set forth in claim 9 including complementary flash removing members adjacent and cooperable with said article supporting means for removing flash from said article remote from said neck.

12. The construction set forth in claim 9 including means for adjusting said article supporting means to cater for varying article lengths.

References Cited

UNITED STATES PATENTS

| | | | |
|---|---|---|---|
| 1,883,996 | 10/1932 | Leland | 83—251 |
| 1,965,341 | 7/1934 | Houston | 83—39 |
| 2,119,942 | 6/1938 | Hessenbruch | 83—214 X |
| 2,266,527 | 12/1941 | Wimmer | 83—39 |
| 2,385,926 | 10/1945 | Linscott | 83—251 |

ANDREW R. JUHASZ, *Primary Examiner.*

WILLIAM W. DYER, JR., *Examiner.*

L. B. TAYLOR, *Assistant Examiner.*